(12) United States Patent
Furet et al.

(10) Patent No.: US 7,934,234 B2
(45) Date of Patent: Apr. 26, 2011

(54) TRANSMISSION AND RECEPTION OF TELEVISION PROGRAMMES AND OTHER DATA

(75) Inventors: Thierry Furet, Rambouillet (FR); Bernard Agasse, Eragny/Oise (FR); Claire Frezal-Hugonet, Limours (FR); Hongtao Liao, Montigny-Btx (FR); Jacques Moly, Soisy sur Seine (FR); Christophe Declerck, Senantes (FR); Liang Rui Yang, Paris (FR)

(73) Assignee: Thomson Licensing, Boulogne-Billancourt (FR)

( * ) Notice: Subject to any disclaimer, the term of this patent is extended or adjusted under 35 U.S.C. 154(b) by 1469 days.

(21) Appl. No.: 10/679,241

(22) Filed: Oct. 6, 2003
(Under 37 CFR 1.47)

(65) Prior Publication Data
US 2004/0139472 A1    Jul. 15, 2004

Related U.S. Application Data

(63) Continuation of application No. 10/349,490, filed on Jan. 23, 2003, now abandoned, which is a continuation of application No. 10/157,036, filed on May 30, 2002, now abandoned, which is a continuation of application No. 09/989,699, filed on Nov. 21, 2001, now abandoned, which is a continuation of application No. 09/780,677, filed on Feb. 12, 2001, now abandoned, which is a continuation of application No. 09/571,014, filed on May 15, 2000, now abandoned, which is a continuation of application No. 09/400,270, filed on Sep. 21, 1999, now abandoned, which is a continuation of application No. PCT/EP97/02110, filed on Apr. 25, 1997.

(30) Foreign Application Priority Data

Mar. 21, 1997    (EP) ..................... 97400650

(51) Int. Cl.
*G06F 3/00* (2006.01)
(52) U.S. Cl. ............. 725/51; 725/63; 725/112; 725/122
(58) Field of Classification Search .................. 725/109, 725/110, 51, 63, 64, 65, 67, 68, 86, 87, 99, 725/106, 111, 112, 113, 122, 123, 136
See application file for complete search history.

(56) References Cited

U.S. PATENT DOCUMENTS 5,329,590 A    7/1994  Pond
(Continued)

FOREIGN PATENT DOCUMENTS

EP    0746119    *   5/1996
(Continued)

OTHER PUBLICATIONS

Office Action issued by the U.S. Patent and Trademark Office on Sep. 13, 2007, in related U.S. Appl. No. 10/201,641 (32 pages).
(Continued)

*Primary Examiner* — Brian T Pendleton
*Assistant Examiner* — Nnenna Ekpo
(74) *Attorney, Agent, or Firm* — Osha • Liang LLP

(57) ABSTRACT

In a digital television system, a receiver/decoder (or "set-top-box") can download one or more of several applications which can be run by the receiver/decoder to provide interactivity with the user. The applications include: an Internet browser application which uses a PSTN connection to make Internet requests and the television signal path to receive Internet responses; a shopping application operable in an "impulse" mode and a "catalogue" mode; a banking application; a quiz application which runs in synchronization with a quiz television programme; a magazine browser application; and a weather or traffic application.

12 Claims, 26 Drawing Sheets

U.S. PATENT DOCUMENTS

| | | | |
|---|---|---|---|
| 5,535,216 A * | 7/1996 | Goldman et al. | 370/503 |
| 5,594,490 A * | 1/1997 | Dawson et al. | 725/67 |
| 5,642,418 A | 6/1997 | Farris et al. | |
| 5,761,602 A * | 6/1998 | Wagner et al. | 725/34 |
| 5,805,204 A | 9/1998 | Thompson et al. | |
| 5,903,816 A * | 5/1999 | Broadwin et al. | 725/110 |
| 5,917,915 A | 6/1999 | Hirose et al. | |
| 5,959,659 A * | 9/1999 | Dokic | 725/152 |
| 6,118,976 A * | 9/2000 | Arias et al. | 725/118 |
| 6,240,555 B1 * | 5/2001 | Shoff et al. | 725/110 |

FOREIGN PATENT DOCUMENTS

EP 746119 A2 * 12/1996

OTHER PUBLICATIONS

"Functional model of a conditional access system"; EBU Project Group B/CA, EBU Technical Review, Winter 1995, No. 266, Dec. 21, 1995; pp. 64-77 (14 pages).

* cited by examiner

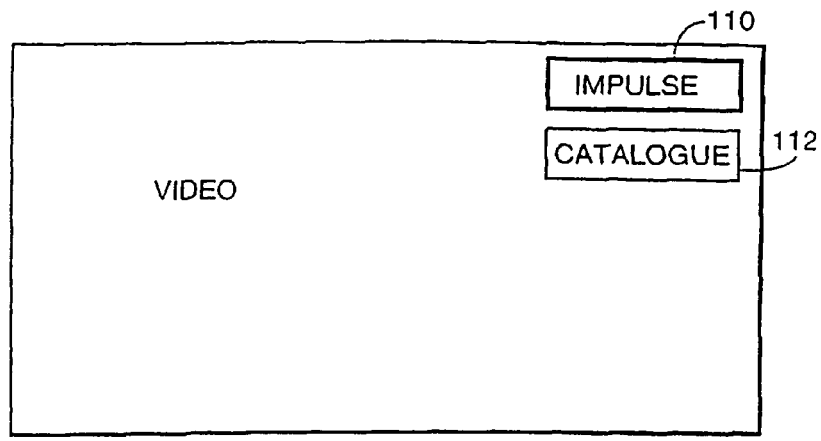
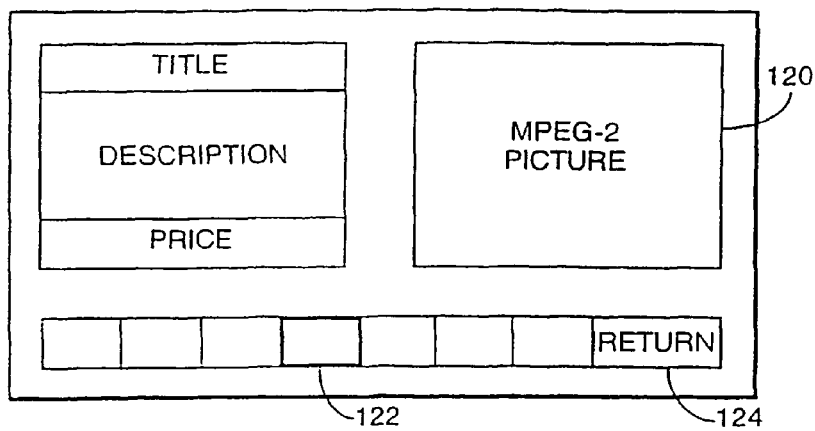
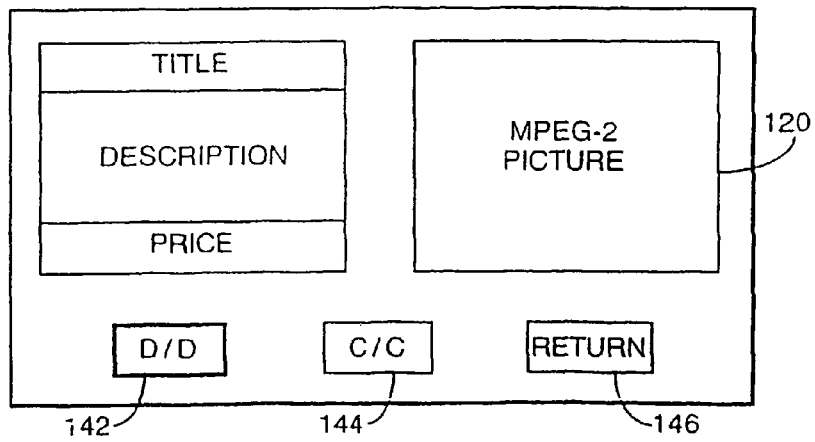

TRANSMISSION AND RECEPTION OF TELEVISION PROGRAMMES AND OTHER DATA

This invention relates generally to be transmission and reception of television programmes and other data, and more particularly to:—
- a method of transmitting a television programme and other data;
- a digital television receiver/decoder; and
- a (communications and) digital television transmission system.

The advent of digital transmission systems intended primarily for broadcasting television signals, in particular but not exclusively satellite television systems, has opened up the possibility of using such systems for other purposes, such as to provide interactivity with the end user or to provide the end user with additional information.

In accordance with a first aspect of the present invention, there is provided a method of transmitting a television programme and other data, comprising the steps:—
at a transmitting system, of transmitting a digital datastream containing at least one television programme;
at a user's receiver/decoder, of:—
receiving the digital datastream;
in a television mode:—
    extracting such a television programme from the digital datastream; and
    supplying the extracted television programme to a television; and
in an Internet mode:—
    using a modem to dial up a communications centre;
    receiving an Internet request from the user; and
    transmitting the received Internet request via the modem to the communications centre;
at the communications centre, of:—
receiving such an Internet request;
obtaining from the Internet a response to the received Internet request; and
supplying the Internet response to the transmitting system;
at the transmitting system, of integrating the supplied Internet response into the digital datastream; and
at the receiver/decoder, in the Internet mode, of:—
extracting the Internet response from the digital datastream; and
supplying the extracted Internet response to the user.

The extracted Internet response may be supplied to the user by being displayed on the television or via a computer connected to the receiver/decoder.

Accordingly, this aspect of the invention gives the user access to the Internet without necessarily requiring a computer, such as a personal computer. Furthermore, Internet traffic is generally far heavier from the Internet server to the user, than from the user to the server; This aspect of the invention provides for the heavy traffic to be transmitted on the high-speed television link, with the lighter traffic being transmitted on a low-speed telephone link. Accordingly, significant access time improvements can be made, but without requiring the expense and complication of a two-way television-type link.

In case the end user experiences problems in receiving the Internet response, the system is preferably selectively operable in a mode in which the communications centre supplies the Internet response to the receiver/decoder via the modem.

The method may further include the steps:—
at the transmitting system, of integrating into the digital datastream application code for an application for causing the receiver/decoder to operate in the Internet mode; and
at the receiver/decoder, in a download mode, of:—
extracting the application code from the digital datastream; and
starting the application defined by the extracted application code to cause the receiver/decoder to operate in the Internet mode.

Accordingly, initial loading of the Internet mode application code, and updating thereof, can be easily achieved, and there is no need for the receiver/decoder to have the capacity to store the application code permanently.

The method may further include the steps:—
at the transmitting system, of integrating shopping data into the digital datastream;
at the receiver/decoder, in a shopping mode, of:—
extracting the shopping data from the digital datastream;
supplying the extracted shopping data to the television;
receiving a purchase order from the user in response to the supplied shopping data;
using the modem to dial up a communications centre; and
transmitting the received purchase order via the modem to the communications centre; and
at the communications centre, of:—
receiving such a purchase order; and
processing the received purchase order.

These latter steps may be provided independently of the first aspect of the invention. Accordingly, a second aspect of the present invention provides a method of transmitting a television programme and other data, comprising the steps:—
at a transmitting system, of transmitting a digital datastream containing at least one television programme and shopping data;
at a user's receiver/decoder, of:—
receiving the digital datastream;
in a television mode:—
    extracting such a television programme from the digital datastream; and
    supplying the extracted television programme to a television; and
in a shopping mode:—
    extracting the shopping data from the digital datastream;
    supplying the extracted shopping data to the user;
    receiving a purchase order from the user in response to the supplied shopping data;
    using a modem to dial up a communications centre; and
    transmitting the received purchase order via the modem to the communications centre; and
at the communications centre, of:—
receiving such a purchase order; and
processing the received purchase order.

This aspect of the invention therefore enables "armchair" shopping by the user with relatively little modification being required to the equipment used for receiving the television programmes.

Preferably, at the receiver/decoder, in the shopping mode:—
the receiver/decoder supplies the extracted shopping data to the user via the television;
the receiver/decoder causes at least one icon to be displayed by the television; and
in response to the purchase order from the user, the receiver/decoder causes a change in display of such an icon by the television.

The system may have an "impulse" mode of operation in which the user makes a purchase order by selecting a product (which may include a service) which is currently the subject of the television programme. The system may additionally or alternatively have a "catalogue" mode of operation, in which a user selects, at any time, from a plurality of products.

The method may further include the step of supplying an acknowledgement to the user, and the acknowledgement may include the actual price to be paid by the user. This can therefore take into account any discount which may be given to the user, or any difference between the currencies used to advertise the product and to purchase the product.

This method may further include the steps:—
at the transmitting system, of integrating into the digital datastream application code for an application for causing the receiver/decoder to operate in the shopping mode; and
  at the receiver/decoder, in a or the download mode, of:—
    extracting the application code from the digital datastream; and
    starting the application defined by the extracted application code to cause the receiver/decoder to operate in the shopping mode.

Accordingly, initial loading of the shopping mode application code, and updating thereof, can be easily achieved, and there is no need for the receiver/decoder to have the capacity to store the application code permanently.

The methods above may further include the steps:—
at a user's receiver/decoder, in a banking mode, of:—
supplying banking options to the user;
receiving a banking request from the user in response to the supplied options;
using the modem to dial up a communications centre; and
transmitting the received banking request to the communications centre;
at the communications centre, of:—
receiving such a banking request;
processing the received banking request and producing a response or acknowledgment; and
transmitting the response or acknowledgement to the receiver/decoder via the modem; and
at the receiver/decoder, in the banking mode, of:—
receiving such a response or acknowledgment; and
supplying the response or acknowledgement to the user.

These latter steps may be provided independently of the first or second aspect of the invention. Accordingly, a third aspect of the present invention provides a method of transmitting a television programme and other data, comprising the steps:—
at a transmitting system, of transmitting a digital datastream containing at least one television programme;
at a users receiver/decoder, of:—
receiving the digital datastream;
in a television mode:—
  extracting such a television programme from the digital datastream; and
  supplying the extracted television programme to a television; and
in a banking mode:—
  supplying banking options to the user;
  receiving a banking request from the user in response to the supplied options;
  using a modem to dial up a communications centre; and
  transmitting the received banking request to the communications centre;
at the communications centre, of:—
receiving such a banking request;
processing the received banking request and producing a response or acknowledgment; and
transmitting the response or acknowledgement to the receiver/decoder via the modem; and
at the receiver/decoder, in the banking mode, of:—
receiving such a response or acknowledgment; and
supplying the response or acknowledgement to the user.

This aspect of the invention therefore enables "armchair" banking by the user with relatively little modification being required to the equipment used for receiving the television programmes.

The communications centre need not necessarily be on a single site, and may typically include a communications server and a bank server which are remote from each other.

Preferably, at the receiver/decoder, in the banking mode:—
the receiver/decoder supplies the banking options and/or the response or acknowledgement from the communications centre to the user via a television;
the receiver/decoder causes at least one icon to be displayed by the television; and
in response to the banking request from the user and/or the response or acknowledgement from the communications centre, the receiver/decoder causes a change in display of such an icon by the television.

This method may. further include the steps:—
at the transmitting system, of integrating into the digital datastream application code for an application for causing the receiver/decoder to operate in the banking mode;
  at the receiver/decoder, in a or the download mode, of:—
    extracting the application code from the digital datastream; and
    starting the application defined by the extracted application code to cause the receiver/decoder to operate in the banking mode.

Accordingly, initial loading of the banking mode application code, and updating thereof, can be easily achieved, and there is no need for the receiver/decoder to have the capacity to store the application code permanently.

This method may further. include the steps, at the receiver/decoder, of:—
reading data from a bank card provided by the user; and
incorporating such read data into the purchase order or the banking request, as the case may be, transmitted to the communications centre.

Accordingly, there is no need for the user to enter their banking details, although a facility may be provided to require the user to enter a personal identification number ("PIN").

The above methods may further include the steps:—
at the transmitting system, of integrating into the digital datastream quiz data including answer data relating to and synchronised to the content of such a television programme; and
  at the receiver/decoder, in a quiz mode, of:—
  extracting the quiz data from the digital datastream;
  receiving from the user a response to the quiz data or to a synchronised question in the television programme;
  comparing the received response and the answer data; and
  supplying the result of the comparison to the television.

These latter steps may be provided independently of the first to third aspects of the invention. Accordingly, a fourth aspect of the present invention provides a method of transmitting a television programme and other data, comprising the steps:—
at a transmitting system, of transmitting a digital datastream containing at least one television programme and quiz data including answer data relating to and synchronised to the content of said one television programme; and at a user's receiver/decoder, of:—
receiving the digital datastream; and
in a quiz mode:—
   extracting said one television programme from the digital datastream;
   supplying the extracted television programme to a television;
   extracting the quiz data from the digital datastream;
   receiving from the user a response to the quiz data or to a synchronised question in the television programme;
   comparing the received response and the answer data; and
   supplying the result of the comparison to the television.

Accordingly, a user may actively participate in a televised quiz programme, with the receiver/decoder being able to check the user's answers and optionally keep the user's score.

Preferably, at the receiver/decoder in the quiz mode in response to the comparison step, the receiver/decoder causes one of a plurality of icons to be displayed by the television selected in dependence upon the result of the comparison.

This method may further include the steps:—
at the transmitting system, of integrating into the digital datastream application code for an application for causing the receiver/decoder to operate in the quiz mode; and
   at the receiver/decoder, in a or the download mode, of:—
   extracting the application code from the digital datastream; and
   starting the application defined by the extracted application code to cause the receiver/decoder to operate in the quiz mode.

Accordingly, initial loading of the quiz mode application code, and updating thereof, can be easily achieved, and there is no need for the receiver/decoder to have the capacity to store the application code permanently.

The above methods may further include the steps:—
at a transmitting system, of integrating into the digital datastream a plurality of pages of magazine page data; and
   at a user's receiver/decoder, in a magazine mode, of:—
   extracting a first one of the pages of magazine page data from the digital datastream;
   supplying the extracted first page to the television;
   receiving an instruction from the user to select another page;
   extracting the magazine page data relating to said other page from the digital datastream;
   supplying the extracted other page to the television; and
   repeating the instruction receiving, other page extracting, and other page supplying steps;
   wherein, in the magazine mode:—
   at least one of the pages includes a plurality of button objects, one of which has initial focus; and
   the instruction receiving step for selecting the subsequent page comprises the steps of:—
      receiving one or more instructions from the user via a remote controller for the receiver/decoder to change that one of the button objects which has focus;
      changing the button object focus in accordance with the received focus changing instruction(s);
      receiving an instruction from the user via the remote controller to select that one of the button objects which currently has focus; and
      determining the identity of the subsequent page from the magazine page data of the current page and the selected button object.

These latter steps may be provided independently of the first to fourth aspects of the invention. Accordingly, a fifth aspect of the present invention provides a method of transmitting a television programme and other data, comprising the steps:—
at a transmitting system, of transmitting a digital datastream containing at least one television programme and a plurality of pages of magazine page data; and
   at a user's receiver/decoder, of:—
   receiving the digital datastream;
   in a television mode:—
      extracting such a television programme from the digital datastream; and
      supplying the extracted television programme to a television; and
   in a magazine mode:—
      extracting a first one of the pages of magazine page data from the digital datastream;
      supplying the extracted first page to the television;
      receiving an instruction from the user to select another page;
      extracting the magazine page data relating to said other page from the digital datastream;
      supplying the extracted other page to the television; and
      repeating the instruction receiving, other page extracting, and other page supplying steps;
   wherein, in the magazine mode:—
   at least one of the pages includes a plurality of button objects, one of which has initial focus; and
   the instruction receiving step for selecting the subsequent page comprises the steps of:—
      receiving one or more instructions from the user via a remote controller for the receiver/decoder to change that one of the button objects which has focus;
      changing the button object focus in accordance with the received focus changing instruction(s);
      receiving an instruction from the user via the remote controller to select that one of the button objects which currently has focus; and
      determining the identity of the subsequent page from the magazine page data of the current page and the selected button object.

This aspect of the invention therefore enables a magazine facility to be provided, and the user can navigate through the pages of the magazine by changing the focus on various buttons and selecting a focused button.

Preferably, the magazine page data for at least one of the pages includes sound data, and further including the step of supplying the sound data to the television in response to selection via the remote controller of one of the button objects.

This method may further include the steps:—
at the transmitting system, of integrating into the digital datastream application code for an application for causing the receiver/decoder to operate in the magazine mode; and
   at the receiver/decoder, in a or the download mode, of:—
   extracting the application code from the digital datastream; and
   starting the application defined by the extracted application code to cause the receiver/decoder to operate in the magazine mode.

Accordingly, initial loading of the magazine application code, and updating thereof, can be easily achieved, and there is no need for the receiver/decoder to have the capacity to store the application code permanently.

The above methods may further include the steps:—
at a transmitting system, of integrating into the digital datastream a plurality of pages of weather or traffic data; and at a user's receiver/decoder, in a weather or traffic mode, of:—
receiving an instruction from the user to select a particular page of the weather or traffic data;
extracting the selected page of weather or traffic data from the digital datastream; and
supplying the extracted page to the television;
wherein, in the weather or traffic mode:—
the pages of weather or traffic data relate to respective geographical regions and are distinguishable by established codes for those regions; and
the instruction receiving step for selecting the particular page comprises receiving from the user the code for the respective region.

These latter steps may be provided independently of the first to fifth aspects of the invention. Accordingly, a sixth aspect of the present invention provides a method of transmitting a television programme and other data, comprising the steps:—
at a transmitting system, of transmitting a digital datastream containing at least one television programme and a plurality of pages of weather or traffic data; and
at a user's receiver/decoder, of:—
receiving the digital datastream;
in a television mode:—
extracting such a television programme from the digital datastream; and
supplying the extracted television programme to a television; and
in a weather or traffic mode:—
receiving an instruction from the user to select a particular page of the weather or traffic data;
extracting the selected page of weather or traffic data from the digital datastream; and
supplying the extracted page to the television;
wherein, in the weather or traffic mode:—
the pages of weather or traffic data relate to respective geographical regions and are distinguishable by established codes for those regions; and
the instruction receiving step for selecting the particular page comprises receiving from the user the code for the respective region.

Accordingly, a user can select a relevant page of weather or traffic information simply by entering a code which the user is highly likely to know, without necessarily having to navigate through pages of other data or having to find out a less meaningful code.

The established codes preferably comprise at least part of the postal codes, zip codes, state, county or department numbers or codes, telephone area codes, other administrative codes, or the like, for the geographical regions.

This method may further include the steps:—
at the transmitting system, of integrating into the digital datastream application code for an application for causing the receiver/decoder to operate in the weather or traffic mode; and
at the receiver/decoder, in a or the download mode, of:—
extracting the application code from the digital datastream; and
starting the application defined by the extracted application code to cause the receiver/decoder to operate in the weather or traffic mode.

Accordingly, initial loading of the weather or traffic application code, and updating thereof, can be easily achieved, and there is no need for the receiver/decoder to have the capacity to store the application code permanently.

With any of the above aspects of the invention, the transmitting system may be arranged to transmit the digital datastream in an MPEG format, with the data other than the television programme(s) being included in at least one private section of the MPEG datastream.

Various other aspects of the invention relate to a digital television receiver/decoder which is arranged to perform the appropriate steps in the methods of the first to sixth aspects of the invention. Also, various further aspects of the invention relate to a (communications and) digital television transmission system which is arranged to perform the relevant steps in the methods of the first to sixth aspects of the invention.

Preferred features of the present invention will now be described, purely by way of example, with reference to the accompanying drawings, in which:—

FIGS. 18-20 illustrate examples of various screens of the television set of the system of FIG. 15;

Figure 1:
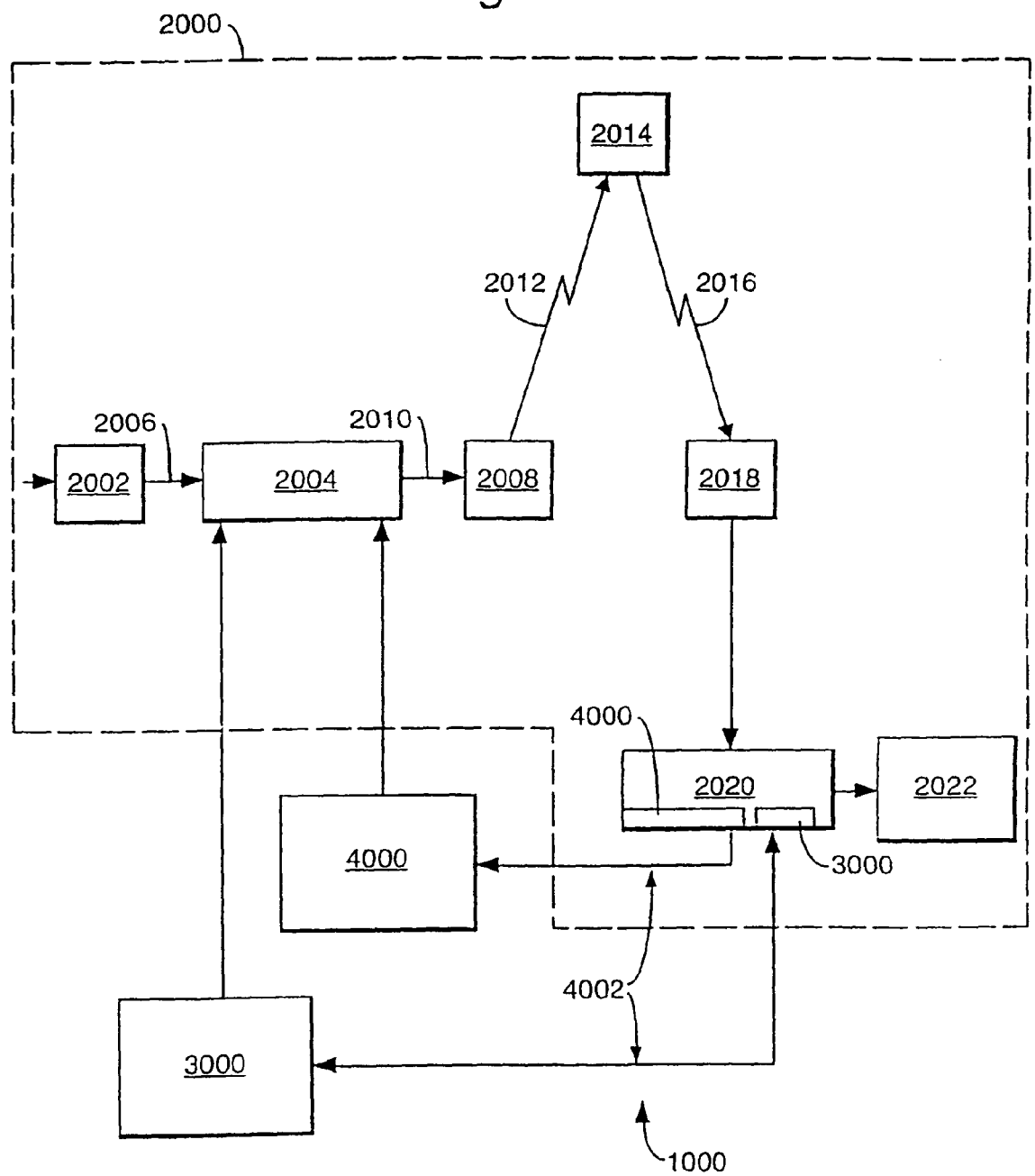
FIG. 1 shows the overall architecture of a digital television system.

An overview of a digital television system 1000 according to the present invention is shown in FIG. 1. The invention includes a mostly conventional digital television system 2000 which uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecommunications links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2026 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2020. Using the decoder 2020 and smartcard, the end user may purchase commercial offers in either a subscription mode or a pay-per-view mode.

An interactive system 4000, also connected to the multiplexer 2004 and the receiver/decoder 2020 and again located partly in the broadcast centre and partly in the decoder, enables the end user to interact with various applications via a modemmed back channel 4002.

Figure 2:
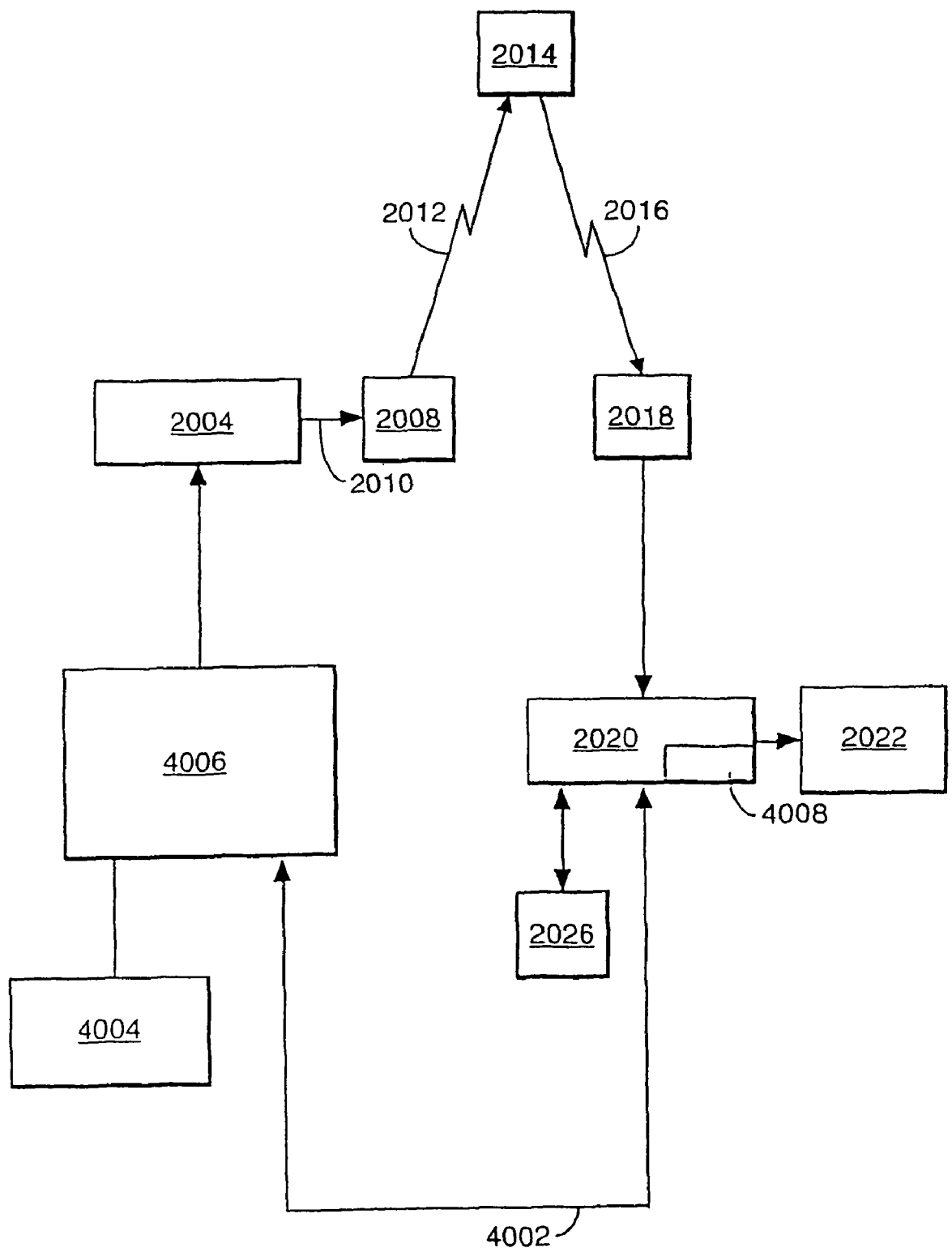
FIG. 2 shows the architecture of an interactive system of the digital television system of FIG. 1.

FIG. 2 shows the general architecture of the interactive television system 4000 of the digital television system 1000 of the present invention.

For example, the interacting system 4000 allows an end user to buy items from on-screen catalogues, consult local news and weather maps on demand and play games through their television set.

The interactive system 4000 comprises in overview four main elements:—
- an authoring tool 4004 at the broadcast centre or elsewhere for enabling a broadcast supplier to create, develop, debug and test applications;
- an application and data server 4006, at the broadcast centre, connected to the authoring tool 4004 for enabling a broadcast supplier to prepare, authenticate and format applications and data for delivery to the multiplexer and scrambler 2004 for insertion into the MPEG-2 transport stream (typically the private section thereof) to be broadcast to the end user;
- a virtual machine including a run time engine (RTE) 4008, which is an executable code installed in the receiver/decoder 2020 owned or rented by the end user for enabling an end user to receive, authenticate, decompress, and load applications into the working memory of the decoder 2020 for execution. The engine 4008 also runs resident, general-purpose applications. The engine 4008 is independent of the hardware and operating system; and
- a modemmed back channel 4002 between the receiver/decoder 2020 and the application and data server 4006 to enable signals instructing the server 4006 to insert data and applications into the MPEG-2 transport stream at the request of the end user.

The interactive television system operates using "applications" which control the functions of the receiver/decoder and various devices contained therein. Applications are represented in the engine 4008 as "resource files". A "module" is a set of resource files and data. A "memory volume" of the receiver/decoder is a storage space for modules. Modules may be downloaded into the receiver/decoder 2020 from the MPEG-2 transport stream.

Figure 3:
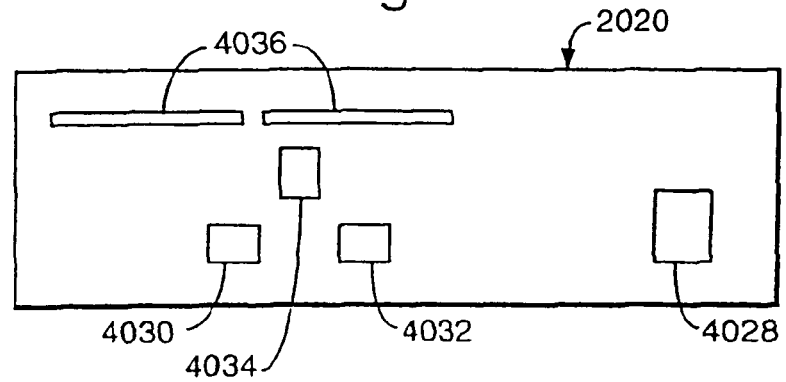
FIG. 3 is a schematic diagram of interfaces of a receiver/decoder forming part of the system of FIGS. 1 and 2.

Physical interfaces of the receiver/decoder 2020 are used for downloading data. With reference to FIG. 3, the decoder 2020 contains, for example, six downloading devices; MPEG flow tuner 4028, serial interface 4030, parallel interface 4032, modem 4034 and two card readers 4036.

Figure 4:
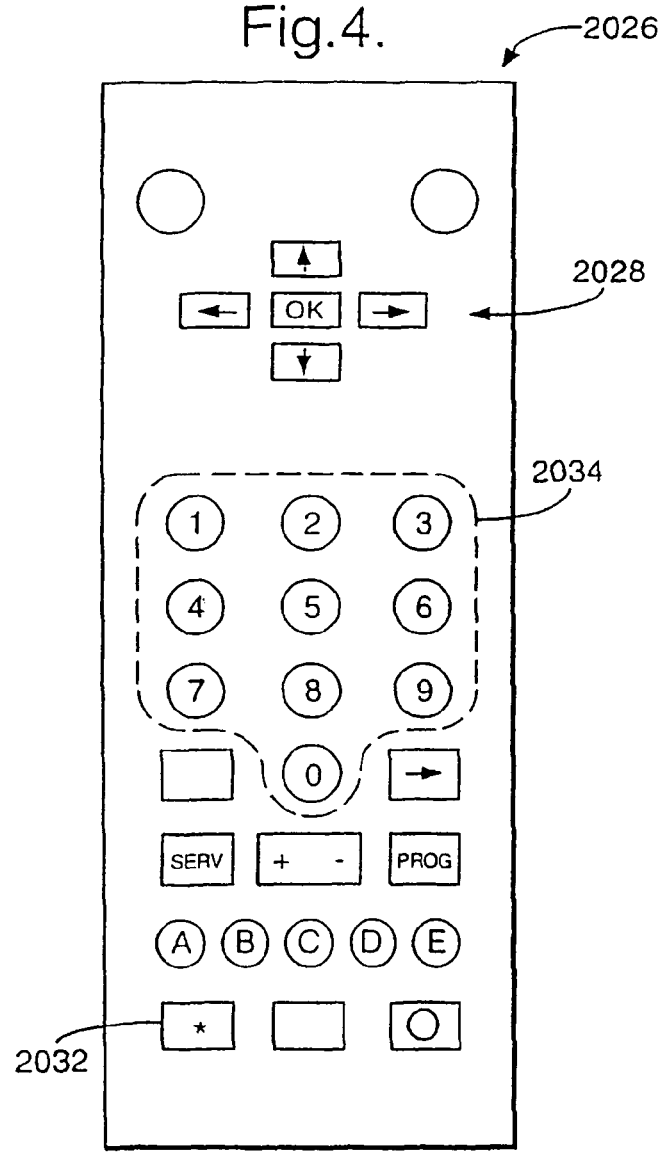
FIG. 4 is a schematic diagram of a remote controller used in the digital television system.

For the purposes of this specification, an application is a piece of computer code for controlling high level functions of preferably the receiver/decoder 2020. For example, when the end user positions the focus of a remote controller 2026 (as shown in more detail in FIG. 4) on a button object seen on the screen of the television set 2022 and presses the validation key, the instruction sequence associated with the button is run.

An interactive application proposes menus and executes commands at the request of the end user and provides data related to the purpose of the application. Applications may be either resident applications, that is, stored in the ROM (or FLASH or other non-volatile memory) of the receiver/decoder 2020, or broadcast and downloaded into the RAM (or FLASH) of the receiver/decoder 2020 by extracting the application code from the digital datastream.

Figure 5:
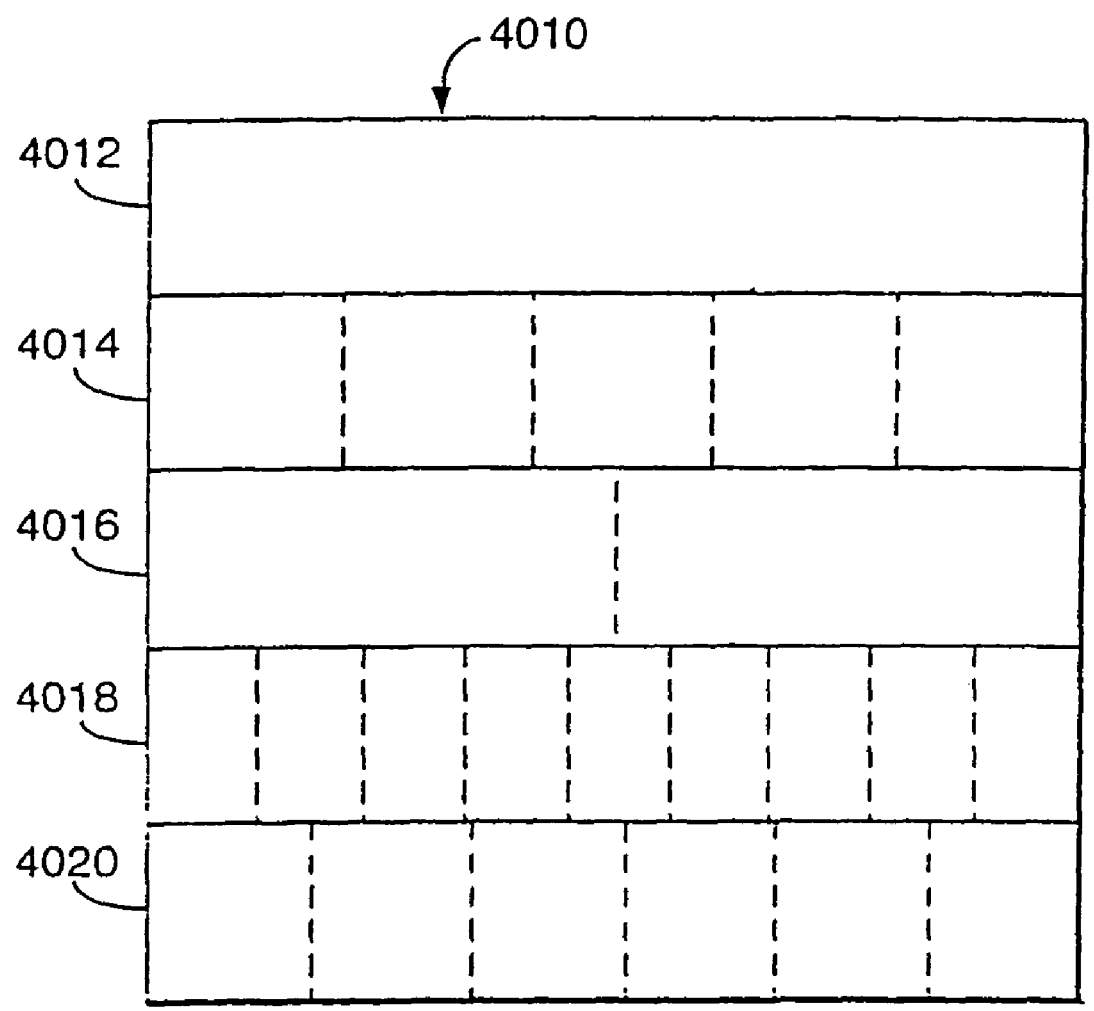
FIG. 5 shows the arrangement of files within a module downloaded into the memory of an interactive receiver/decoder.

Applications are stored in memory locations in the receiver/decoder 2020 and represented as resource files and data. The resource files comprise graphic object description unit files, variables block unit files, instruction sequence files and application files. With reference to FIG. 5, a module 4010, such as a shopping module to be described below, is a set of resource files and data comprising the following:
- a single application file 4012;
- an undetermined number of graphic object description unit files 4014;
- an undetermined number of variables block unit files 4016;
- an undetermined number of instruction sequence files 4018; and
- where appropriate, data files 4020 such as icon library files, image files, character font files, colour table files and ASCII text files.

The graphic object description unit files describe the screens, the man-machine interface of the application. The variables block unit files describe the data structures handled by the application. The instruction sequence files describe the processing operations of the applications. The application files provide the entry points for the applications.

The applications constituted in this way can use data files, such as the icon library files, image files, character font files, colour table files and ASCII text files. An interactive application can also obtain on-line data. by effecting inputs and/or outputs.

The engine 4008 only loads into its memory those resource files it needs at a given time. These resource files are read from the graphic object description unit files, instruction sequence files and application files; variables block unit files are stored in memory following a call to a procedure for loading modules and remain locked there until a specific call to a procedure for unloading modules is made.

Examples of applications are as follows, and each will then be described in greater detail:
- an initiating application;
- a startup application;
- a program guide;
- a pay-per-view application;
- a PC download application;
- an Internet browser application;
- a shopping application;

a banking application;
a quiz application;
a magazine browser application; and
a weather or traffic application.

With regard to the initiating application, the receiver/decoder 2020 is equipped with a resident initiating application which is an adaptable collection of modules enabling the receiver/decoder 2020 to be immediately operative in the MPEG-2 environment. The application provides core features which can be modified by the broadcast supplier if required. It also provides an interface between resident applications and downloaded applications.

With regard to the startup application, this allows any application, either downloaded or resident, to run on the receiver/decoder 2020. This application acts as a bootstrap executed on arrival of a service in order to start the application. Startup is downloaded into RAM and therefore can be updated easily. It can be configured so that the interactive applications available on each channel can be selected and run, either immediately after downloading or after preloading. In the case of preloading, the application is loaded into the memory 2024 and is activated by the startup when required.

The program guide is an interactive application which gives full information about programming. For example, it may give information about, say, one week's television programmes provided on each channel of a digital television bouquet. By depressing a key on the remote controller 2026, the end user accesses an add-on screen, overlaid on the event shown on the screen of the television set 2022. This add-on screen is a browser giving information on the current and next events of each channel of the digital TV bouquet. By depressing another key on the remote controller 2026, the end user accesses an application which displays a list of information on events over one week. The end user can also search and sort events with simple and customised criteria. The end user can also access directly a selected channel.

The pay-per-view ("PPV") application is an interactive service available on each PPV channel of the digital TV bouquet in conjunction with the conditional access system 3000. The end user can access the application using a TV guide or channel browser. Additionally, the application starts automatically as soon as a PPV event is detected on the PPV channel. The end user is then able to buy the current event either through his daughter smartcard 3020 or via the communication server 3022 (using a modem, a telephone and DTMF codes, MINITEL or the like). The application may be either resident in the ROM of the receiver/decoder 2020 or downloadable into the RAM of the receiver/decoder 2020.

With regard to the PC download application, on request, an end user can download computer software using the PC download application.

With regard to the Internet browser application, this enables web pages to be supplied to the end user via the receiver/decoder 2020 for display on either television set 2022 or via a computer connected to the receiver/decoder 2020.

Modem 4034 of the receiver/decoder 2020, or alternatively an external modem, such as a V34 modem capable of transferring data at up to 28.8 kbytes per second, connected to the serial interface, is connected via a telephone line to the application and data server 4006.

In operation, first assume that the receiver/decoder 2020 is operating in a "television mode", that is, extracting a television programme from the digital bitstream and supplying the television programme extracted therefrom to the television set 2022 for display to the end user. By pressing a button on the remote controller 2026, the end user is able to activate the Internet browser application, placing the receiver/decoder 2020 in an "Internet mode". The application runs a program stored in the receiver/decoder 2020 to dial the application and data server 4006 using the modem 4034. Once communication between the receiver/decoder 2020 and the application and data server 4006 has been established, the end user is informed of the connection to the Internet by means of a message displayed on the television set 2022.

The end user inputs an Internet request, such as a request to view a web page having a particular URL, to the receiver/decoder 2020 using the remote controller 2026. The receiver/decoder 2020 outputs this request to the server 4006 via the modem 4034. The server 4006 receives this request and outputs the request to the Internet. In response to this request, the Internet supplies an Internet response, comprising the appropriate web page, to the server 4006. The server 4006 delivers the response to the multiplexer and scrambler 2004, where it is integrated into the private section of the MPEG bitstream and transmitted by the transmitter 2008 and received by receiver 2018 as previously mentioned. The receiver/decoder 2020 extracts the web page from the MPEG bitstream and displays the web page on the television set 2022.

As an alternative to supplying the web page to the end user by displaying the web page on the television set 2022, the web page may be supplied to the end user via a computer connected to the receiver/decoder 2020, typically via a parallel 700 kbits per second interface. Instead of inputting Internet requests to the receiver/decoder 2020 by means of the remote controller 2026, the end user may input such requests via a keyboard or such like connected to the computer. If the user employs a PC in conjunction with the receiver/decoder 2020, the PC can run well known web browser applications such as Netscape and Microsoft Internet Explorer without any modification to those applications, the required change being at the driver level, as will be described in detail below.

As indicated earlier, Internet traffic is generally far heavier from the Internet server to the user, than from the user to the server 4006. The Internet browser application provides for the heavy traffic to be transmitted on the high-speed television link, typically 38 megabits per second. Accordingly, significant access time improvements can be made, but without requiring the expense and complication of a two-way television-type link.

Figure 6:
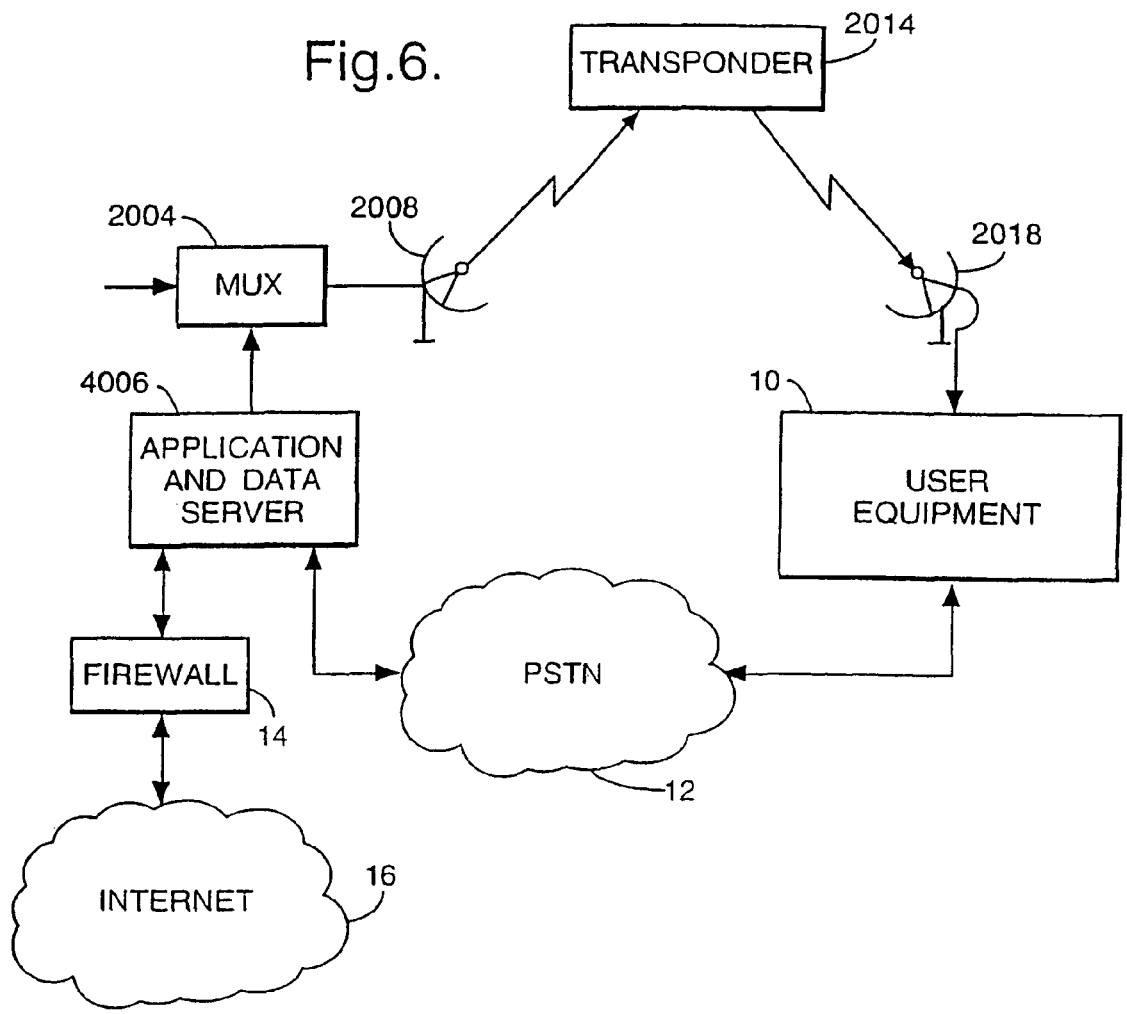
FIG. 6 shows the overall architecture of an embodiment of the system when in its Internet mode.

Referring to FIG. 6, when in the Internet mode, the user equipment 10 is connectable to the application and data server 4006 via the public switched telephone network ("PSTN") 12. The application and data server 4006 is connectable to the Internet 16 via a firewall 14 in a known manner. The application and data server 4006 can also communicate with the user equipment 10 via the multiplexer and scrambler 2004, transmitter 2008, transponder 2014 and receiver 2018.

Figure 7:
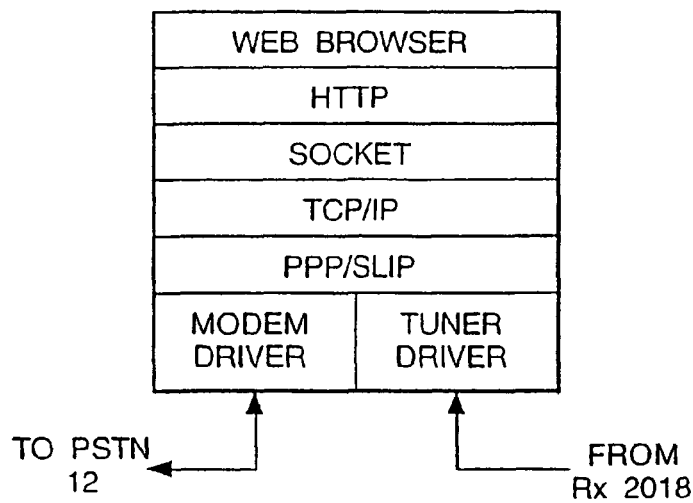
FIG. 7 illustrates software layers in the user equipment of the system of FIG. 6.

As shown in FIG. 7, the software levels employed in the user equipment 10 comprise a web browser application, such as Netscape or Microsoft Internet Explorer, HTTP, socket, TCP/IP, PPP/SLIP and a driver level. The driver level is modified, as compared with a browser application running traditionally on a PC, in that it is divided into a modem driver for communicating with the PSTN 12 via the modem of the user equipment and a tuner driver for communicating via the MPEG flow tuner 4028.

Various configurations of the user equipment 10 will now be described. In one configuration shown in FIG. 8, a PC is not used. All of the user software runs on the receiver/decoder 2020. The receiver/decoder 2020 communicates with the PSTN 12 via its internal modem 4034 (or optionally an external modem and the serial port). The receiver/decoder 2020 can receive Internet responses in the bitstream from the earth receiver 2018. In this configuration, the user interface is provided by the remote controller 2026 and the television set 2022 connected to the receiver/decoder 2020.

Figure 8:
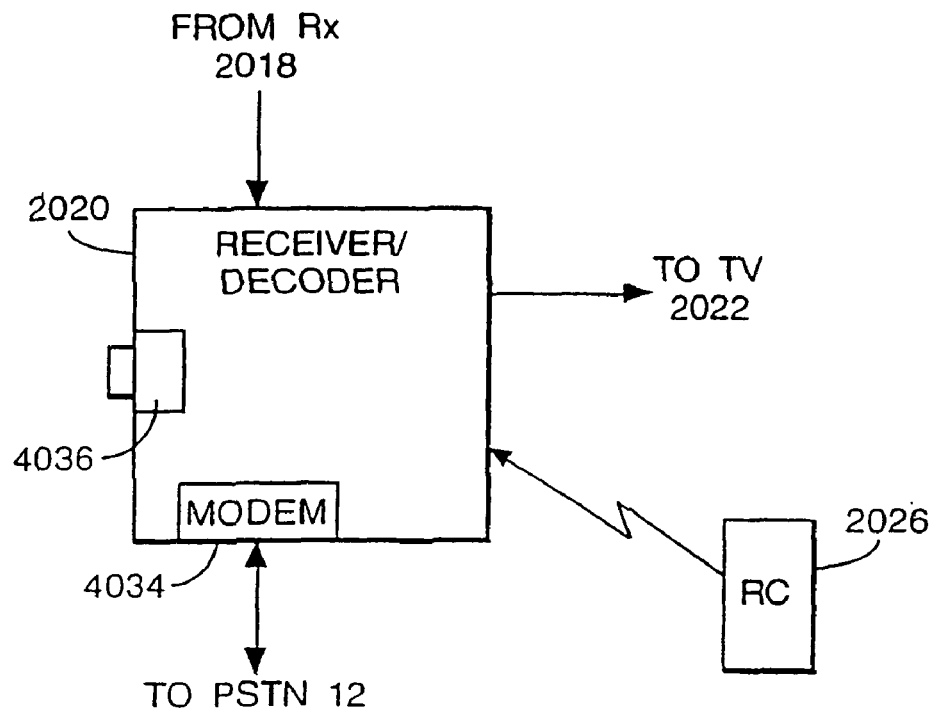
FIGS. 8-12 are block diagrams of various configurations of embodiments of the user equipment of FIG. 6.
Figure 9:
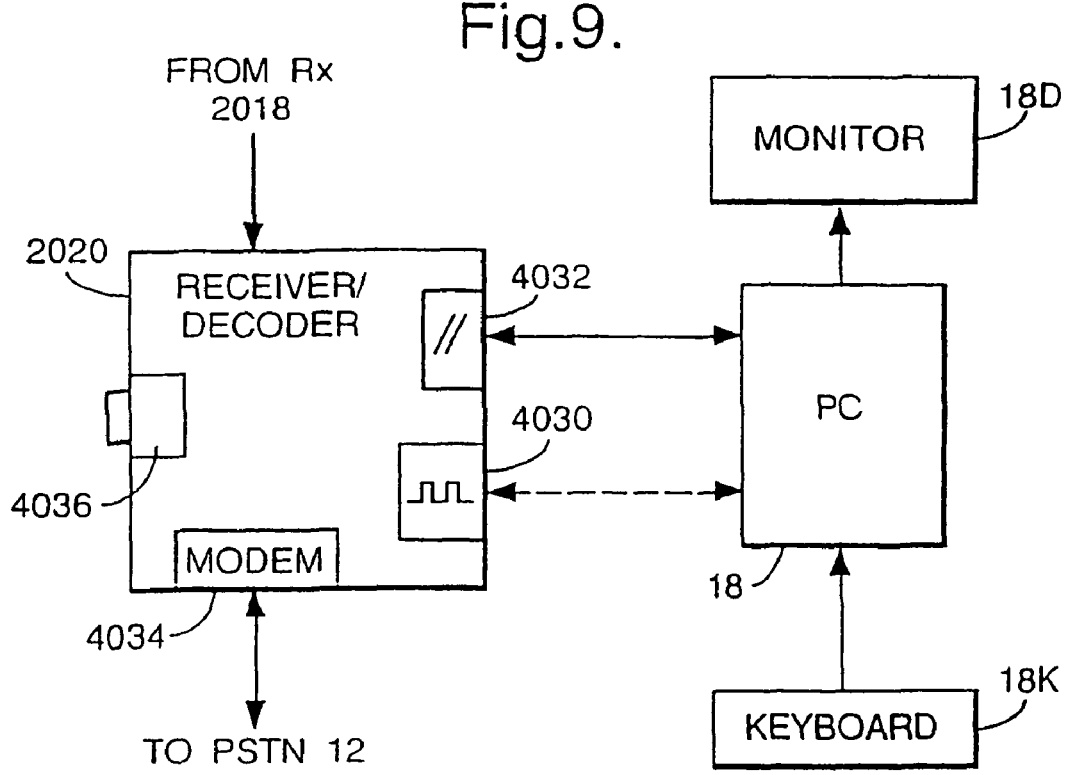

A second configuration as shown in FIG. 9 differs from that of FIG. 8 in that a PC 18 is provided which is connected by its parallel port to the parallel port 4032 of the receiver/decoder 2020 (or optionally by its serial port to the serial port 4030 of the receiver/decoder 2020). In this case, an upper portion of the software levels shown in FIG. 7 run on the PC 18, and the remaining lower portion of the software levels run on the receiver/decoder 2020. Also, the user interface is provided by a keyboard 18K and a monitor 18D connected to the PC 18.

Figure 10:
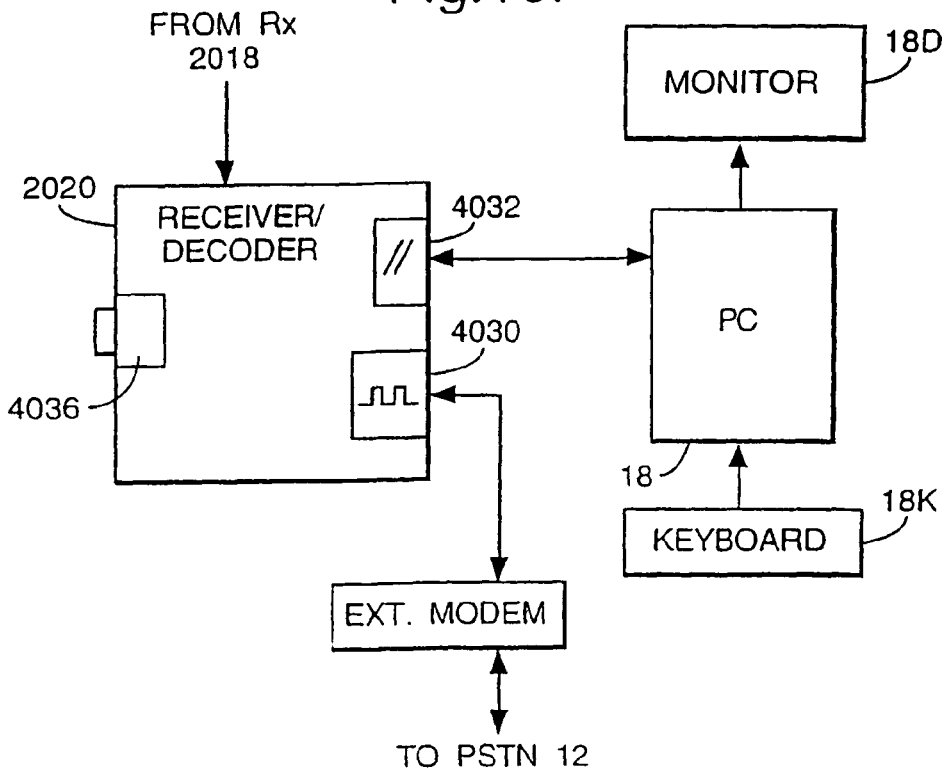

A third configuration as shown in FIG. 10 differs from that of FIG. 9, in that an external modem is used to connect the receiver/decoder 2020 via its serial port 4030 to the PSTN 12. A high speed external modem may be used to provide a faster data rate than provided by the internal modem (if any) of the receiver/decoder 2020.

Figure 11:
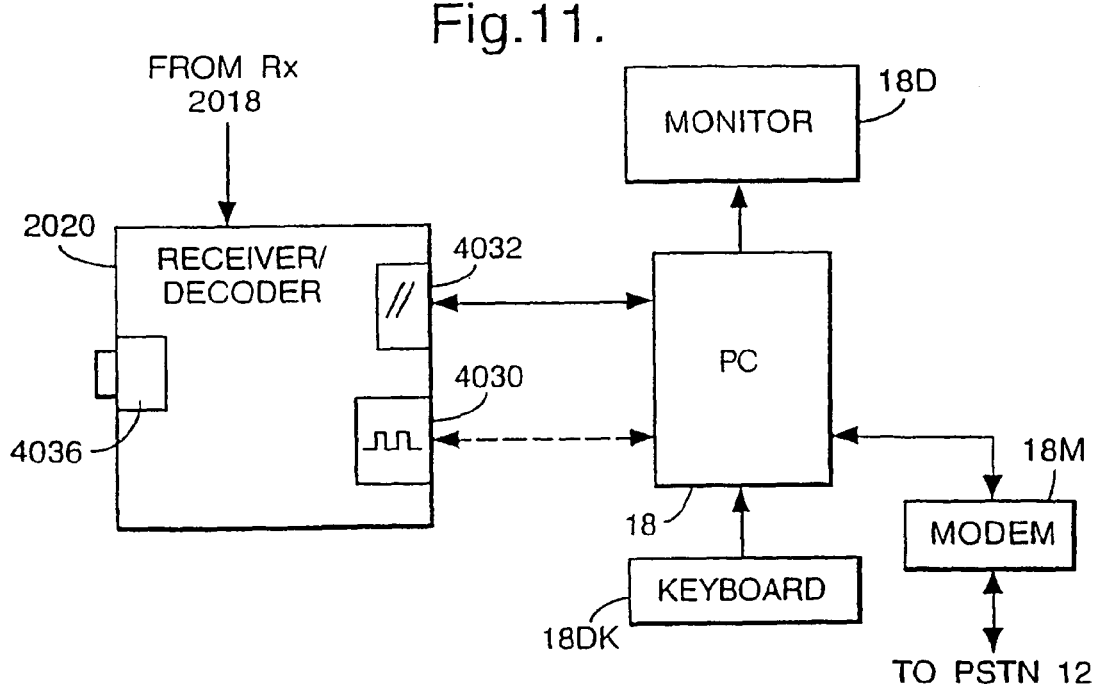

A fourth configuration as shown in FIG. 11 differs from that of FIG. 10 in that it is the PC 18 which is connected to the PSTN 12 via an external modem 18M connected to a serial port of the PC 18 (or alternatively via an internal modem of the PC 18). This configuration provides an advantage over those of FIGS. 9 and 10, in that there is unidirectional data flow from the parallel port 4032 (or serial port 4030) of the receiver/decoder 2020 to the parallel (or serial) port of the PC 18, and therefore faster data rates can be achieved.

Figure 12:
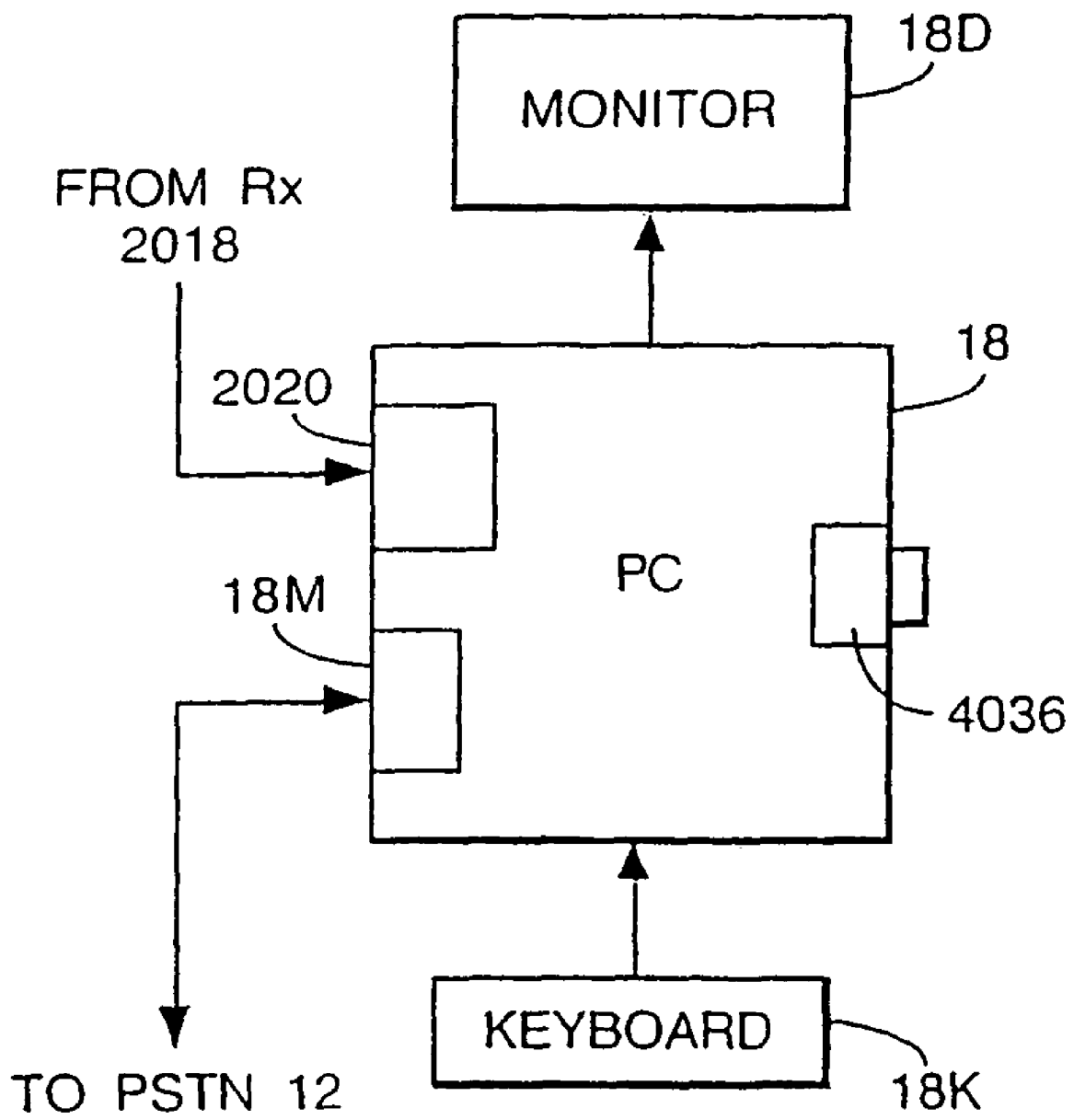

A fifth configuration as shown in FIG. 12 differs from that of FIG. 11 in that the receiver/decoder 2020 is provided in the form of an add-on or plug-in card of the PC 18, connected to the ISA or PCI bus thereof.

The operation of the system in the Internet mode will now be described with reference to the flow diagrams of FIGS. 13 and 14, which on the left illustrate processes of the user equipment 10 and on the right illustrate processes of the application and data server. At step 20, the user requests the Internet mode, for example by pressing a dedicated key on the remote controller 2026 or by pressing a series of keys to call up a menu and navigate through it so as to select the Internet mode. In step 22, the receiver/decoder 2020 extracts from the received MPEG-2 bitstream the Internet application and associated data including the telephone number of the application and data server 4006, and mounts the application.

Figure 13:
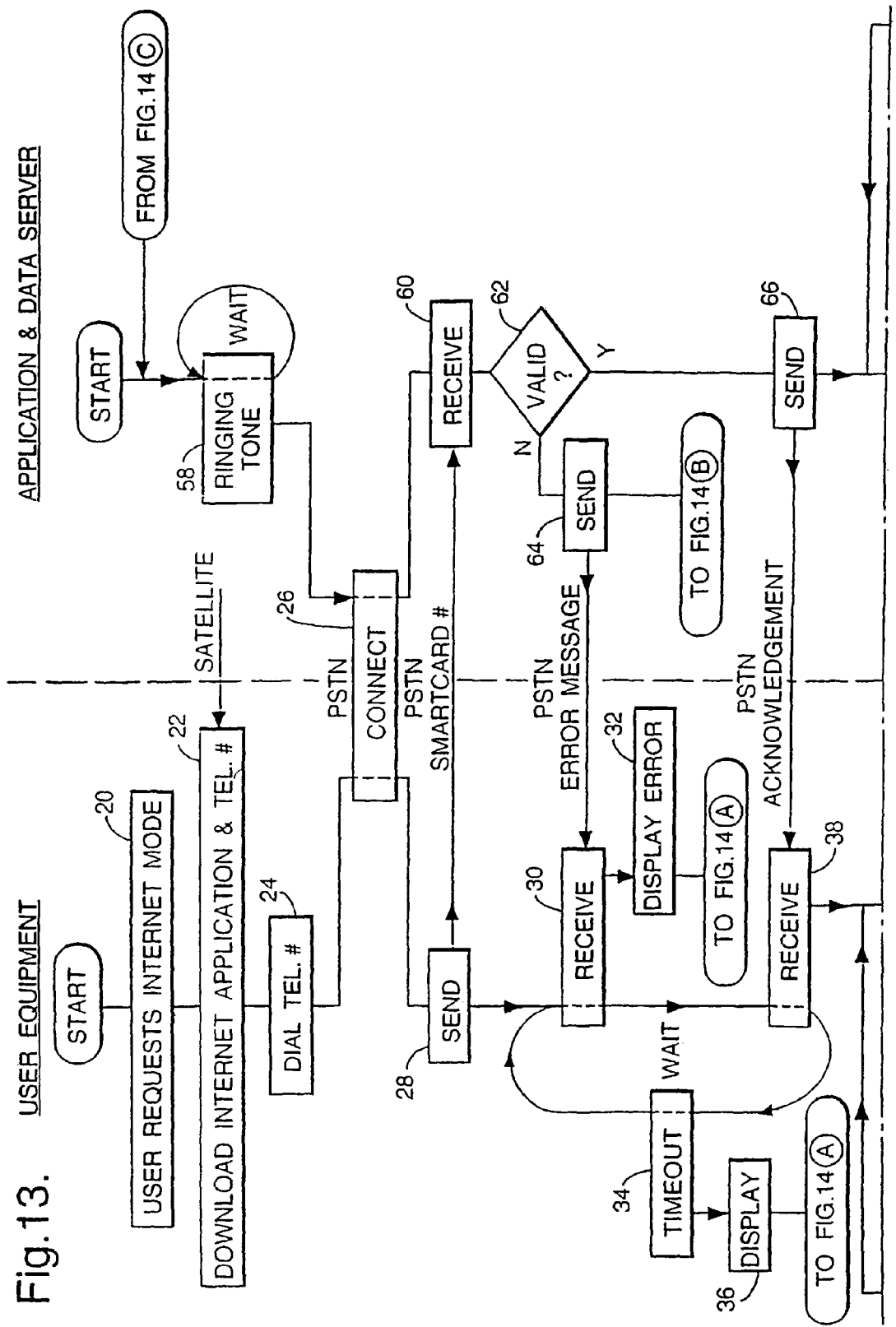
FIG. 13 is a main flow diagram illustrating an example of the operation of the system of FIG. 6.
Figure 13:
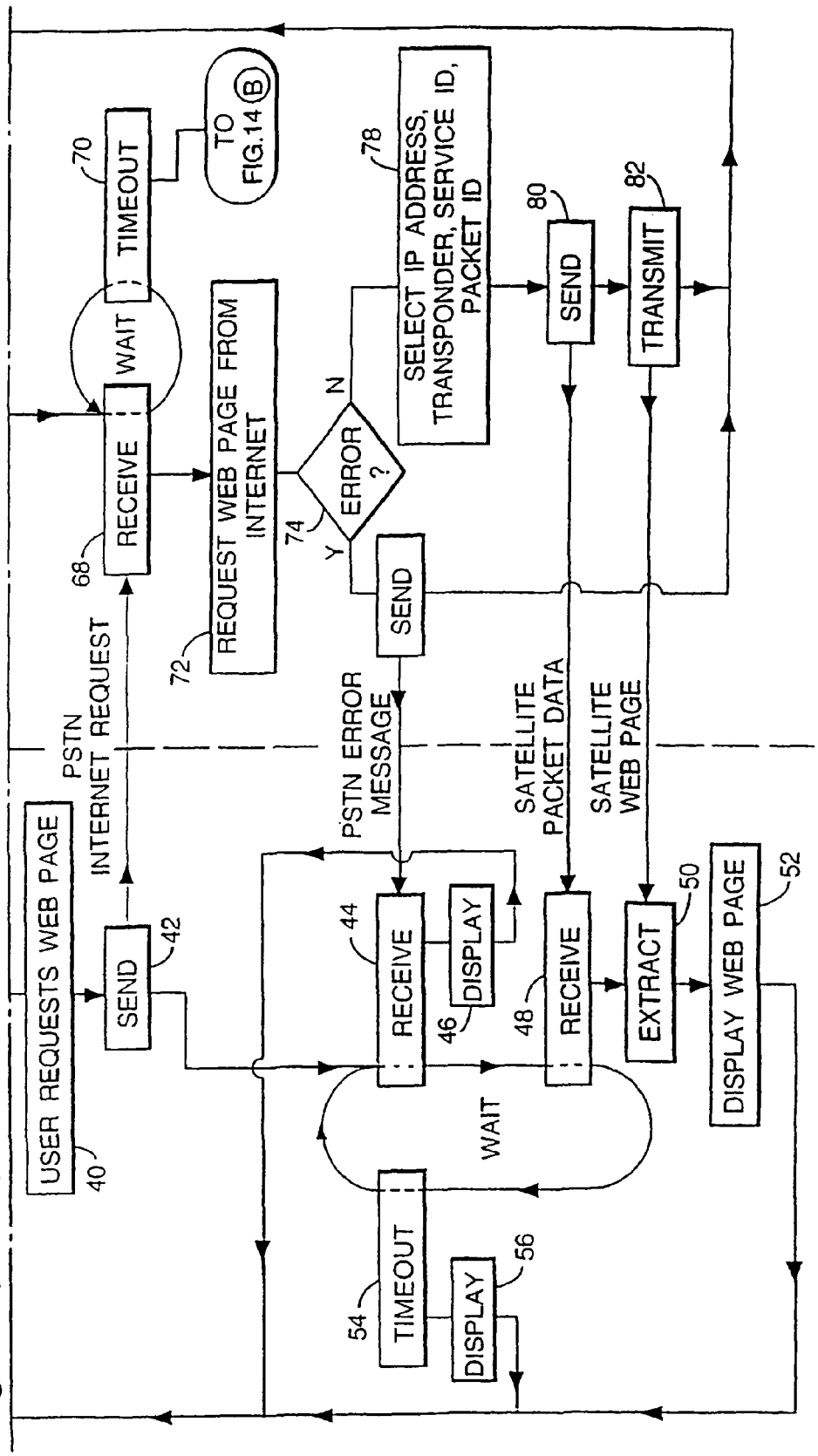
Figure 14:
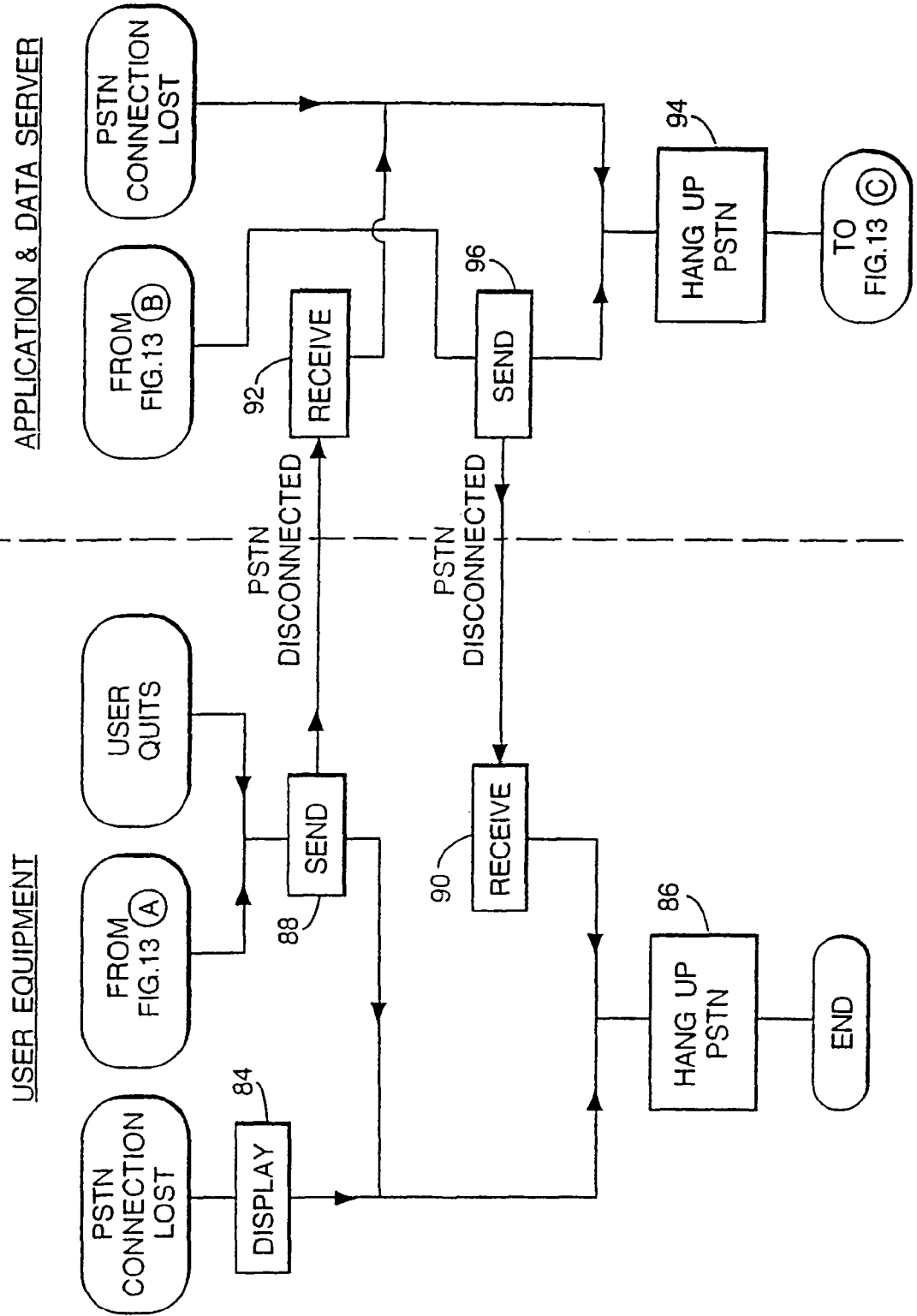
FIG. 14 is an auxiliary flow diagram to the diagram of FIG. 13.

The remaining steps taken by the user equipment 10 in FIGS. 13 and 14 are caused to occur by the downloaded Internet application. In step 24, the user equipment 10 causes the associated modem to dial the downloaded telephone number of the application and data server 4006, and in step 26 a PSTN connection is made. In the Internet mode, the user must have placed their smartcard in one of the card readers 4036, and in step 28 the user equipment 10 sends the smartcard number via the PSTN connection. The user equipment then waits to receive an error message via the PSTN connection in step 30, to receive an acknowledgement. via the PSTN connection in step 38, or for a timeout in step 34.

If an error message is received in step 30, then the error message is displayed on the television 2022 or monitor 18D in step 32, the PSTN connection is disconnected in step 88, and the modem of the user equipment 10 is hung up in step 86. Similarly, if a timeout occurs in step 34, an error message is displayed on the television 2022 or monitor 18D in step 36, the PSTN connection is disconnected in step 88, and the modem is hung up in step 86.

However, if an acknowledgement is received in step 38, the user can then make an Internet request in step 40, for example by specifying the unique resource location ("URL") of a desired web page or of an Internet search engine. In step 42 the Internet request is sent via the PSTN connection, and then the user equipment 10 waits to receive an error message via the PSTN connection in step 44, to receive packet data via the PSTN connection in step 48, or for a timeout in step 54.

If an error message is received in step 44, then the error message is displayed in step 46, and then the process returns to step 40 to await another Internet request from the user. Similarly, if a timeout occurs in step 54, an error message is displayed in step 56, and then the process returns to step 40 to await another Internet request from the user.

If packet data is received via the PSTN connection in step 48, the packet data will contain sufficient information to enable the user equipment 10 to extract the required web page from the MPEG-2 datastream received via the earth receiver 2018. The packet data may include the IP address, the identification of the relevant transponder 2014, the service ID and the packet ID. In step 50, the user equipment 10 extracts the relevant web page, and in step 52 it is displayed by the user interface (the television 2022 or the monitor 18D). The process then returns to step 40 to await another Internet request from the user.

As shown in FIG. 14, the user may quit the process at any time, in which case the PSTN connection is disconnected in step 88, and the modem is hung up in step 86. Also, if the user equipment detects that the PSTN connection has been lost, then a message is displayed in step 84, and the modem is hung up in step 86.

The operation of the application and data server 4006 in FIGS. 13 and 14 will now be described. In step 58, a modem of the server 4006 awaits a ringing tone, and when it arrives the PSTN connection is made in step 26. In step 60, the server 4006 awaits receipt of the smartcard number, and when received, in step 62, checks whether the received smartcard number is valid, for example with reference to the subscriber management system ("SMS") 3004. If not valid, then in step 64 the server 4006 sends the error message described above with reference to step 30, then disconnects the PSTN connection in step 96, hangs up its modem in step 94, and the process then returns to step 58 to await another ringing tone.

If in step 62 the smartcard number is judged to be valid, then in step 66 the server 4006 sends the acknowledgement described above with reference to step 38 and then waits to receive the Internet request, described above with reference to step 42, in step 68, or for a timeout to occur in step 70. If a timeout occurs, then in step 96 the server 4006 disconnects the PSTN connection and hangs up its modem in step 94.

However, if the Internet request is received in step 68, in step 72 the server 4006 requests the relevant web page from the Internet 16 via the firewall 14. In step 74, if the required web page is not successfully received, then in step 76 the server 4006 sends via the PSTN 12 the error message described above with reference to step 44 and then the process returns to step 68/70 to await receipt of another Internet request from the user equipment 10. However, if, in step 74, the required web page is successfully received, then in step 78 the server 4006 determines the packer data for sending the web page via the satellite television system, that is the IP address, transponder ID, service ID and packet ID, and in step 80 sends the packet data via the PSTN 12 to be received by the user equipment 10 in step 48 described above. Then, in step 82, the server 4006 sends the web page and the packet data to the multiplexer and scrambler 2004, and the multiplexer and scrambler 2004 transmits the web page in accordance with the received packet data to be received by the user equipment 10 in step 50 described above. The process then returns to step 68/70 to await receipt of another Internet request from the user equipment 10.

As shown in FIG. 14, if at any time the server 4006 detects that the PSTN connection has been lost, then the server 4006 hangs up its modem in step 94 and returns to step 58 to await a ringing tone.

The shopping mode of operation of the system will now be described. The shopping application enables "armchair" shopping by the end user. Offers of goods (or services or other products) for sale are displayed on the television set 2022 either via a television programme downloaded by the receiver/decoder 2020 or via a "catalogue" downloaded by the receiver/decoder 2020. Goods may be purchased by means of a purchase order input to the receiver/decoder 2020 by the end user.

Modem 4034 of the receiver/decoder 2620, or alternatively an external modem, such as a V34 modem capable of transferring data at up to 28.8 kbytes per second, connected to the serial interface, is connected via a telephone line to the application and data server 4006, or alternatively to a separate sales system the telephone number of which has been downloaded to the receiver/decoder 2020.

In operation, first assume that the receiver/decoder 2020 is operating in a "television mode", that is, extracting a television programme from the digital bitstream and supplying the television programme extracted therefrom to the television set 2022 for display to the end user. By pressing a button on the remote controller 2026, the end user is able to activate the shopping application, placing the receiver/decoder 2020 in a "shopping mode". When the receiver/decoder 2020 has been placed in the shopping mode, the application enables shopping data included in the private section of the MPEG bitstream to be extracted therefrom by the receiver/decoder 2020 and displayed on the screen of the television set 2022.

In a first embodiment of the shopping application, offers of goods for sale are displayed on the television set 2022 via the television programme currently being broadcast by a broadcast supplier (for example, a television programme broadcast or a "shopping channel" of a broadcast supplier) and being downloaded by the receiver/decoder 2020. For example, the shopping data may comprise a series of commands which cause the simultaneous display on the television screen of the television programme and typically one or more icons representing the goods currently being shown in the television programme and the purchase price. The shopping data included in the MPEG bitstream is synchronised with the video and audio signals contained therein so that, as the goods shown in the television programme vary, the shopping data varies so that the icon is updated to represent those goods currently displayed on the television screen.

In a second embodiment, offers of goods for sale are displayed on the television set 2022 via a "catalogue" downloaded by the receiver/decoder 2020. This catalogue may be separate from the television programme currently being displayed on the television 2022. In this embodiment, the shopping data may comprise a series of commands which cause the display on the television screen of typically icons representing the goods on offer and the purchase price. The shopping data may be continuously cycled so that each individual display can be made to appear on the television screen at regular intervals. One or more individual displays may be shown on the television screen at one time, the end user being able to navigate between the displays using buttons on the remote controller 2026.

In either of the above embodiments, the end user may, at will, purchase one of the goods displayed on the television programme by pressing appropriate buttons on the remote controller 2026. This purchase order is received by the receiver/decoder 2020, which runs a program stored in the receiver/decoder 2020 to dial the application and data server 4006 or the separate sales system using the modem. Whilst communication between the receiver/decoder 2020 and, for example, server 4006 is being established, a message, typically in the form of an icon or an animated cartoon, is displayed on the television set 2022. Additionally, in response to a purchase order for particular goods, the application may cause the icon representative of those goods to change.

Once communication has been established, the receiver/decoder 2020 outputs this purchase order to the server 4006 via the modem. The server 4006 receives and processes this order, for example, with an order to debit the account for a credit card which has been inserted into one of the card readers 4036 of the receiver/decoder 2020.

Figure 15:
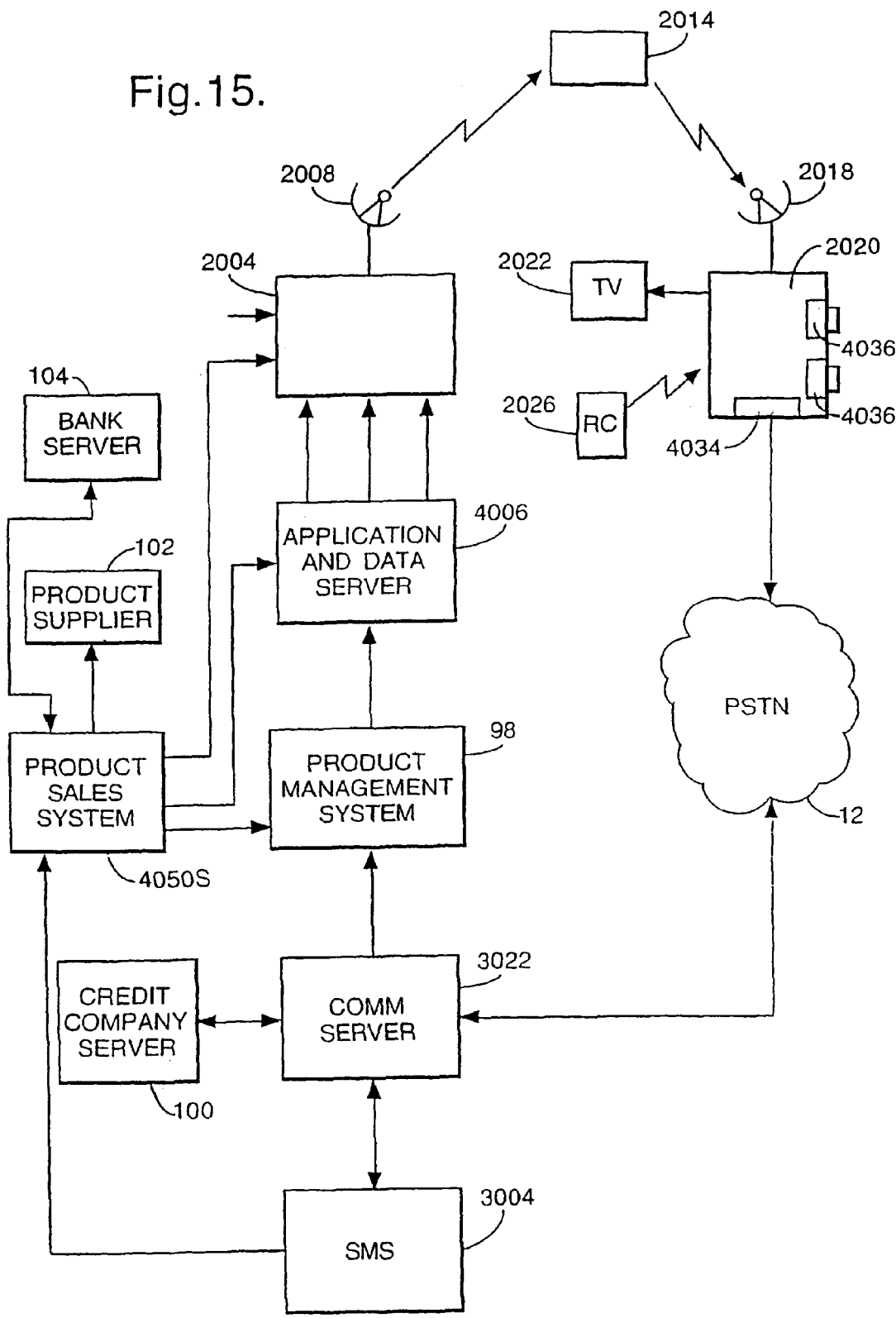
FIG. 15 shows the overall architecture of an embodiment of the system when in its shopping mode.

More specifically, as shown in FIG. 15, the receiver/decoder 2020 is connectable via the PSTN 12 to the communications server 3022. The communications server 3022 is connectable to the SMS 3004 and to a product management system 98 and a credit company server 100. The SMS 3004 is connectable to a product sales system 4050S, which in turn is connectable to the product management system 98, the application and data sever 4006, the multiplexer and scrambler 2004, a product supplier 102 and a bank server 104. The product management system 98 is also connectable to the application and data server. The connection of the product sales system 4050S to the multiplexer and scrambler 2004 enables video and audio of the shopping television programme and also pictures of the products to be supplied by the product sales system and integrated into the broadcast datastream. The connection of the product sales system 4050S to the product management system enables catalogue data to be supplied. The catalogue data includes, for each product, a product reference, a title of the product, a description of the product, the price of the product and an ID for a picture of the product. The catalogue data is then supplied to the application and data server 4006. The connection of the product sales system 4050S to the application and data server 4006 enables a playlist to be supplied to the application and data server 4006. The playlist comprises a list of times, and for each time a product reference of the product which is to be advertised starting at that time. The connections of the application and data server 4006 to the multiplexer and scrambler 2004 enables (1) the shopping application to be transmitted, (2) the catalogue data to be transmitted and (3) synchronisation data to be transmitted, which includes the product reference of the product which is currently the subject of the video and audio data supplied by the product sales system 4050S directly to. the multiplexer and scrambler 2004.

Figure 16:
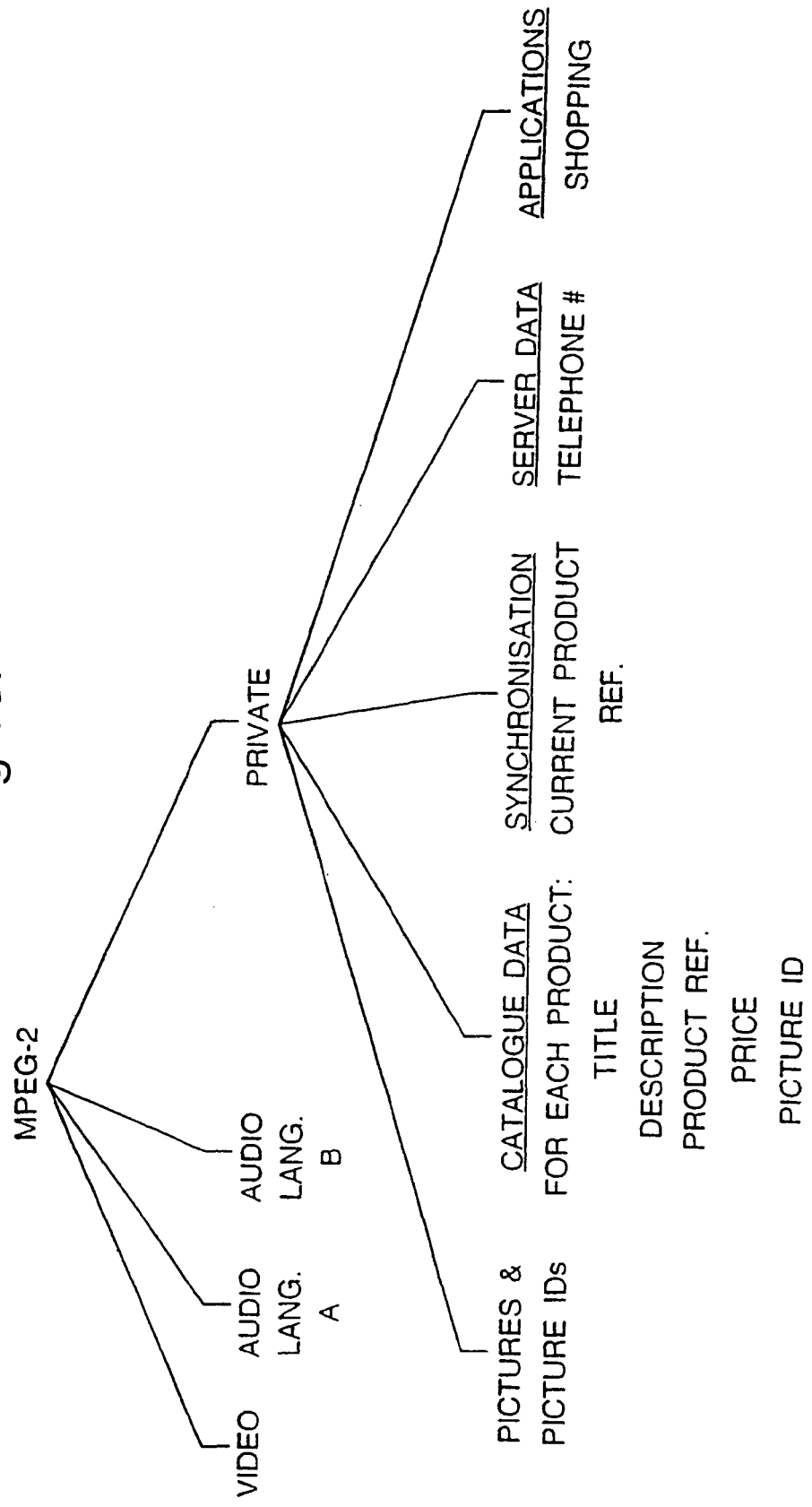
FIG. 16 shows an example of various components of the MPEG-2 bitstream used in the shopping mode.

Referring now to FIG. 16, the components of the broadcast MPEG-2 bitstream relating to the shopping television programme and the shopping application comprise the video section and one or more audio sections of the television programme, together with a private section. The private section contains (1) the shopping application to be run by the receiver/decoder 2020; (2) the telephone number of the communications server 3022; (3) synchronisation data including the product reference of the product which is currently the subject of the shopping television programme; (4) the catalogue data including, for each product, the title, description, reference and price of that product, together with a picture ID for the picture showing the product; and (5) the pictures and picture IDs of the products.

Figure 17:
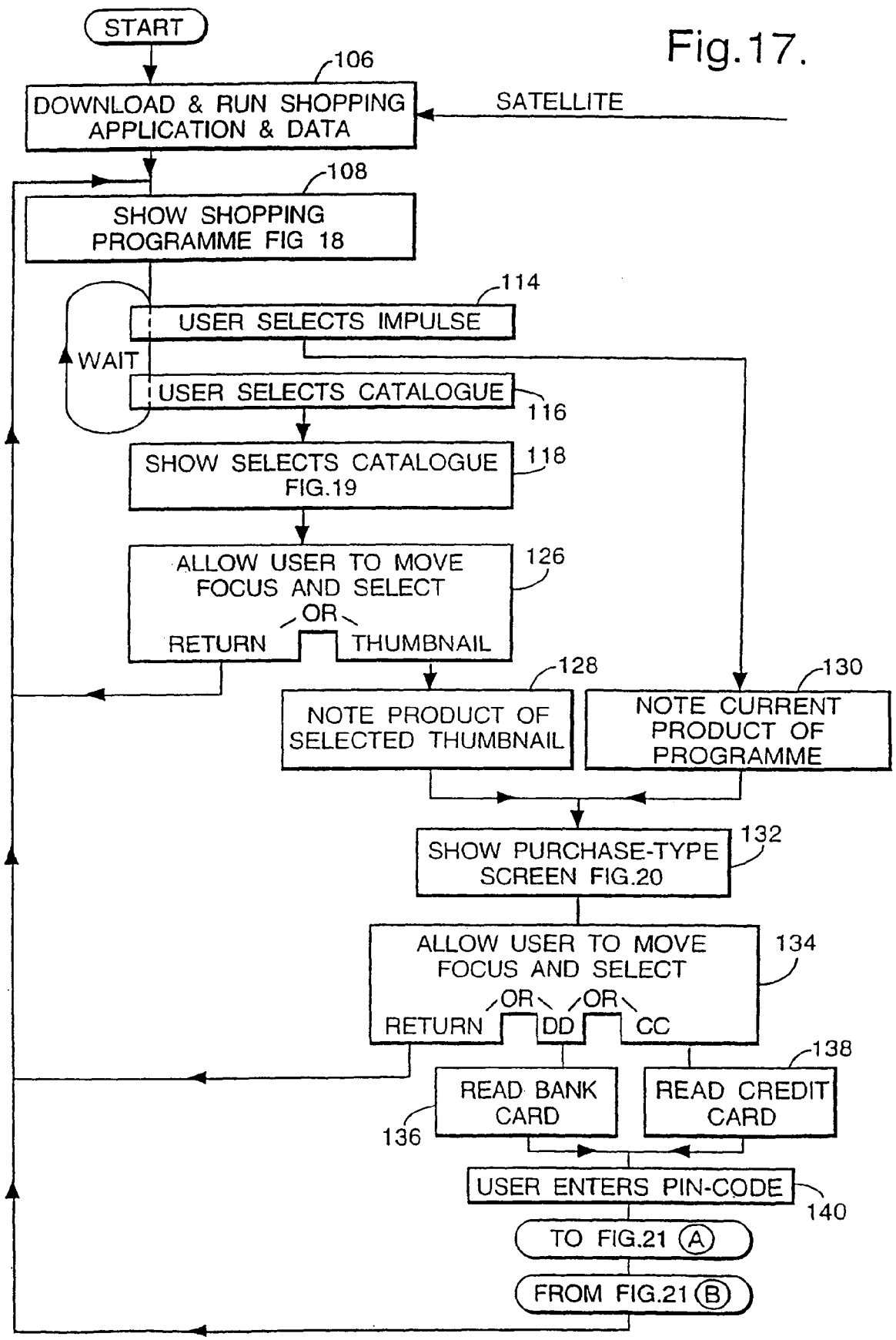
FIG. 17 is a first part of a flow diagram illustrating an example of the operation of the system of FIG. 15.
Figure 21:
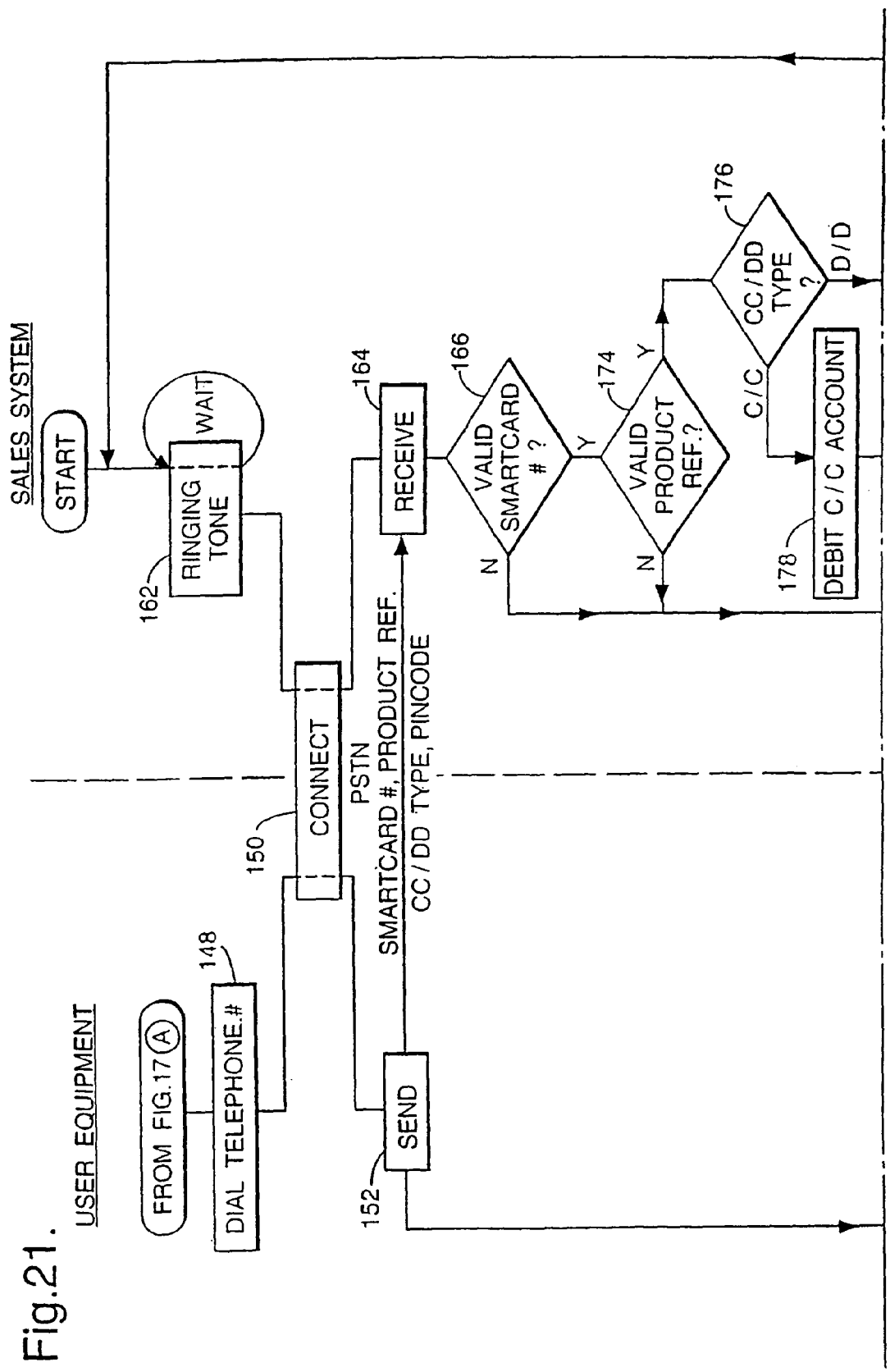
FIG. 21 is a second part of the flow diagram shown partially in FIG. 17.
Figure 21:
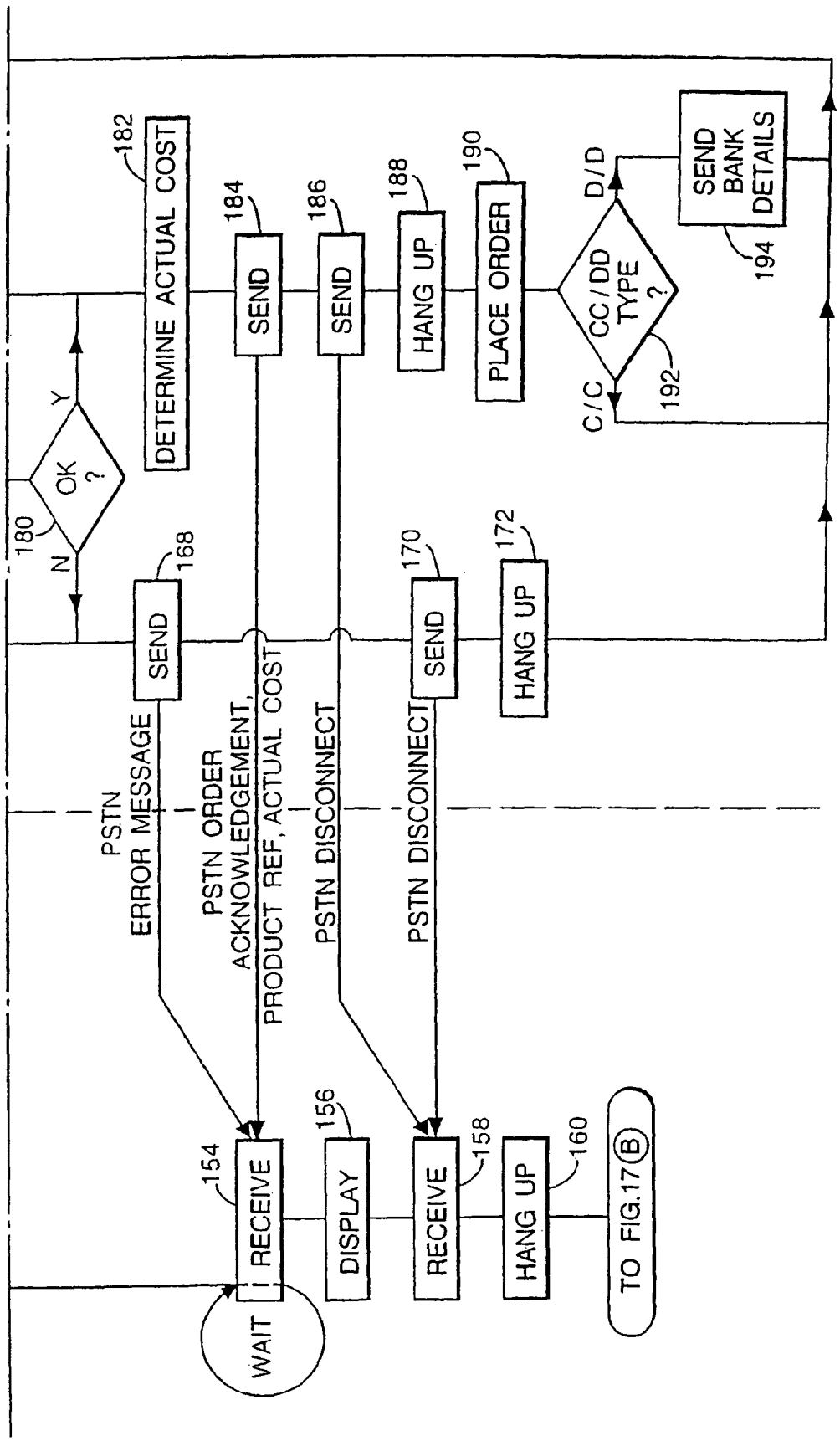

The operation of the system in the shopping mode will now be described with reference to FIGS. 17 to 21. FIG. 17 is a flow diagram illustrating operation of the receiver/decoder 2020, whereas FIG. 21 is a flow diagram which, on the left side, illustrates operation of the receiver/decoder 2020 and, on the right side, illustrates operation of the remainder of the system.

Referring to FIG. 17, when the shopping programme is selected, in step 106 the receiver/decoder 2020 download and runs the shopping application and downwards the associated data. The remaining steps taken by the receiver/decoder 2020 in FIGS. 17 and 21 are caused to occur by the downloaded shopping application. In step 108, the shopping television programme is displayed on the television 2022, and FIG. 18 shows the layout of the display. The video of the broadcast programme covers the majority of the screen. However, two icons are also displayed, one 110 for selecting an impulse purchase, and the other 112 for selecting catalogue shopping. One of the icons 110, 112 has initial focus, for example by having an emboldened border. The user can change the icon which has focus by using "up" and "down" buttons on the remote controller 2026, and can then select the icon which has focus by pressing an "OK" button on the remote controller 2026. After step 108 in FIG. 17, the process waits until the user selects the impulse icon 110 in step 114 or the catalogue icon 112 in step 116. When either icon 110, 112 is selected, it is animated, for example by changing the icon or its position on the television screen. If the catalogue icon 112 is selected in step 116, then the receiver/decoder 2020 causes a screen such as that shown in FIG. 19 to be displayed on the television.

In the lower portion of the screen, a series of "thumbnails" of the pictures of the products being advertised is displayed, together with a "return" button 124. One of the thumbnails 122 has initial focus, and preferably that thumbnail is for the product which was currently being advertised when the catalogue icon 110 was selected in step 116. The upper right portion of the screen is used to display a larger picture 120 of the product which currently has focus, the picture and the thumbnails being taken from the picture data described with reference to FIG. 16. The upper left portion of the screen is used to display the title, description and price of the product which currently has focus. In step 126, the process allows the user to change the focus of the thumbnails by pressing a left arrow button and a right arrow button of the remote controller 2026. Consequently, the focused thumbnail 122 moves to the left or right, and the picture 120 and corresponding title, description and price change accordingly. If the number of products on offer is greater than the number of spaces for the thumbnails, then a strolling action may be employed.

In step 126, if the user presses the "OK" button of the remote controller 2026 whilst the return button is focused, then the process returns to step 108, in which the normal shopping screen of FIG. 18 is displayed. However, in step 126, if the user presses the "OK" button of the remote controller 2026 whilst one of the thumbnails is focused, then in step 128, the receiver/decoder 2020 notes the product reference of the selected thumbnail.

If the user selects the impulse icon 110 in step 114, then in step 130 the receiver/decoder 2020 notes the product reference of the product which is currently being advertised in the shopping television programme, by taking that product reference from the broadcast synchronisation data, as shown in FIG. 16.

After step 128 or 130, in step 13 to the receiver/decoder 2020 causes the television 2022 to display a purchase-type screen as shown in FIG. 20. The upper portion of the screen is similar to that shown in FIG. 19. The lower portion of the screen includes a "D/D" button 142 to select a purchase with payment by direct debit from a bank account, a "C/C" button 144 to select a purchase with payment using a credit card account, and a button 146 to cancel the purchase operation. One of the buttons has initial focus, which is shown by an emboldened border around that button, and the focus can be changed by pressing the left arrow button or the right arrow button of the remote controller 2026. The currently focused button can then be selected by pressing the "OK" button of the remote controller 2026. In step 134, if the OK button is pressed with the return button in focus, then the process returns to step 108, in which the normal shopping screen of FIG. 18 is displayed. If the OK button is pressed with the D/D button 142 in focus, then in step 136 the receiver/decoder 2020 reads data from a bank card inserted in one of the card readers 4036 of the receiver/decoder 2020. On the other hand, if the OK button is pressed with the C/C button 144 in focus, then in step 138 the receiver/decoder 2020 reads data from a credit card inserted in one of the card readers 4036 of the receiver/decoder 2020. These processes may include further steps, not shown in FIG. 17, to prompt the user to insert the appropriate type of card and to return the process to step 108 if an inappropriate type of card is inserted.

In step 140, the receiver/decoder 2020 prompts the user using the television 2022 to insert the appropriate PIN code via the remote controller 2026 for the card which has been inserted into the card reader 4036.

Then, in step 148, the receiver/decoder 2020 causes its modem to dial the telephone number contained in the downloaded data, and in step 150 a PSTN connection is made with the communications server 3022. In step 152, the receiver/decoder 2020 sends a product order in the form of the smartcard number for the user's smartcard which is inserted in the other card reader. 4036, the product reference of the product being ordered, the type of payment, that is credit card or direct debit and including an identification of the credit card account or bank account read from the credit card or bank card in step 138 or 136, and the PIN code entered by the user in step 140.

In step 154, the receiver/decoder 2020 waits for a response from the communications server 3022, which may be an error message or an order acknowledgment including the product reference and the actual cost. Whichever type of response is received, it is displayed on the television 2022 in step 156. The receiver/decoder 2020 then receives a disconnect signal from the communications server 3022 in step 158, and then causes its modem to hang up in step 160. The process then returns to step 108.

Referring to the right side of FIG. 21, the communications server 3022 waits at step 162 for a ringing tone. When received, it makes the PSTN connection 150 mentioned above. The communications server 3022 then receives the product order from the receiver/decoder 2020, as described above with reference to step 152. In step 166, the communications server 3022 checks whether the supplied smartcard number is valid, with reference to the subscriber management system ("SMS") 3004. If invalid, then in step 168, the communications server 3022 sends via the PSTN 12 the error message described with reference to step 154, in step 170 sends the PSTN disconnects signal described with reference to step 158, hangs up its modem in step 172, and then returns to step 162 waiting for another ringing tone.

If the smartcard number is judged to be valid in step 166, then in step 174 the communications server determines with reference to the product management system 98 whether the supplied product reference is valid. If not, then the process proceeds to step 168 described above. However, if the product reference is judged to be valid, then in step 176 the communications server 3022 determines whether the transaction is a C/C transaction or a D/D transaction. If a C/C transaction, then in step 176 the communications server 3022 attempts to debit the user's credit card account with the credit company server 100. If, in step 180, it is determined that the credit card transaction is not successful, then the process proceeds to step 168 described above. However, if the transaction is successful, then the process proceeds to step 182. Also, in step 176, if it is determined that the transaction is a D/D transaction, then the process also proceeds to step 182.

In step 182, the communications server 3022 determines the actual cost of the transaction. This may take into account, for example, discount information for the particular user provided by the SMS 3004. Then, in step 184, the communications server 3022 sends the order acknowledgment described above with reference to step 154. (In FIG. 21, step 182 is shown as taking place after step 180 or 176. Alternatively, or more preferably, step 182 may take place immediately before step 176, or immediately after step 178 and immediately after step 176.)

After step 184, in step 186 the communications server 3022 sends the PSTN disconnect signal described above with reference to step 158 and then causes its modem to hang up in step 188. Then, the communications server 3022 places the order via the SMS 3004 with the product sales system 4050S, the SMS 3004 providing additional information to the product sales system 4050S, such as the name, address and delivery instructions for the particular user who has placed the order. The communications server determines in step 192 whether the transaction is a C/C or D/D transaction. If a C/C transaction, then the process proceeds to step 162 to await the next ringing tone; However, if a D/D transaction, before doing this, in step 194, the communications server 3022 sends the details of the bank account to be debited to the product sales system 4050S via the SMS 3004.

Once the product sales system 4050S has received the order, it can then forward the order to an appropriate product supplier 102, and in the case of a D/D transaction it can cause the appropriate bank server 104 to debit the appropriate account.

The banking application will now be described, which enables "armchair" banking by the end user. By inserting a bank card, such as a credit card, in one of the card readers 4036 of the receiver/decoder 2020, the end user may, for example, download via a telephone line a statement of account, transfer funds between accounts, request a cheque book, etc.

Modem 4034 of the receiver/decoder 2020, or alternatively an external modem, such as a V34 modem capable of transferring data at up to 28.8 kbytes per second, connected to the serial interface, is connected via a telephone line to the banking organisation providing the bank card, the. telephone number of the banking organisation having been downloaded to the receiver/decoder 2020.

In operation, first assume that the receiver/decoder 2020 is operating in a "television mode", that is, extracting a television programme from the digital bitstream and supplying the television programme extracted therefrom to the television set 2022 for display to the end user. By inserting the bank card in the appropriate card reader and pressing a button on the remote controller 2026, the end user is able to activate the banking application, placing the receiver/decoder 2020 in a "banking mode". Whilst there is no requirement for the end user to input their banking details, such as account number, to activate the banking mode, as a safety feature the end user may be prompted by the application to enter a personal identification number (PIN) using the remote controller; if the entered PIN does not correspond to one stored in the bank card, access to the banking mode is denied.

The banking application causes a number of facilities which can be selected using the remote controller 2026 to be displayed on the television screen, such as, for example, downloading via a telephone line a statement of account, transferring funds between accounts, requesting a cheque book, etc. These facilities may be displayed on the television screen in the form of one or more icons. Upon selection of the required facility by the end user (using the appropriate buttons of the remote controller), the receiver/decoder 2020 dials up the user's banking organisation, using the telephone number stored in the bank card or stored in the receiver/decoder 2020, and transmits the received banking request to the banking organisation. In response to the request by the end user, the application may cause the icon relating to the facility requested by the end user to change in display.

The banking organisation receives and processes this request. For example, in relation to the request of a cheque book, the organisation produces an acknowledgement of the request for the end user, which is transmitted to the receiver/decoder 2020 via the modem. Alternatively, in response to a request for the transfer of funds from one account to another, the organisation produces a response to the request which is similarly transmitted to the receiver/decoder 2020 via the modem. This acknowledgement or response is received by the receiver/decoder 2020 and supplied to the end user by display of the acknowledgement or response on the television screen. In response to the acknowledgement or response, the application may cause the icon relating to the facility requested by the end user to change in display.

Figure 22:
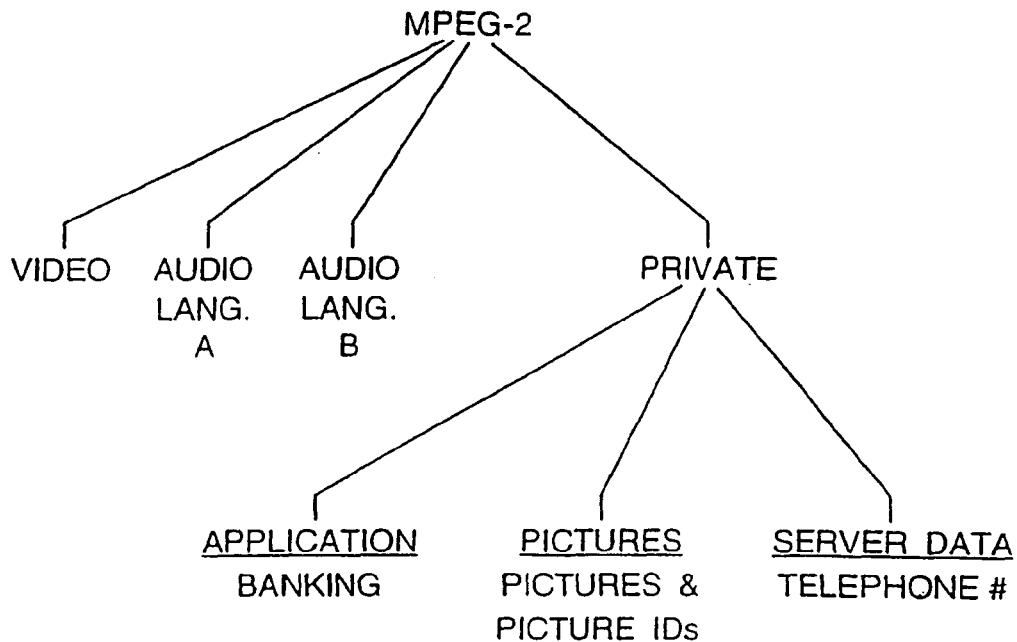
FIG. 22 shows an example of various components of the MPEG-2 bitstream used in the banking mode.
Figure 23:
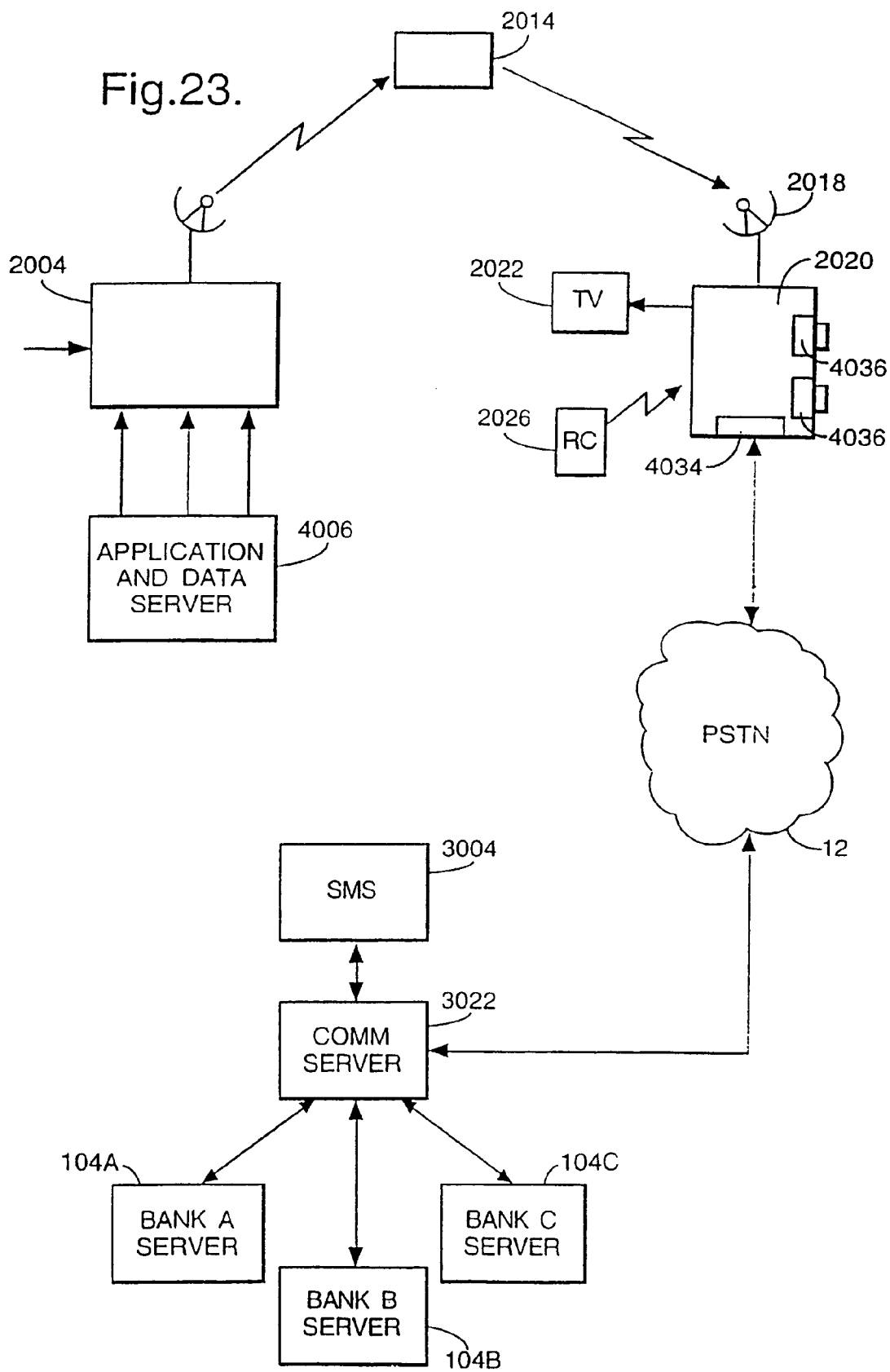
FIG. 23 shows an embodiment of the overall architecture of the system when in its banking mode.

More specifically, referring to FIG. 22, the components of the broadcast MPEG-2 bitstream comprise the video and audio sections described above, together with a private section. The private section contains (1) the banking application to be run by the receiver/decoder 2020; (2) the telephone number of the communications server 3022; and (3) pictures and picture IDs used by the banking application. Referring to FIG. 23, these three components of the private section are supplied to the multiplexer and scrambler 2004 by the application and data server 4006.

FIG. 23 also shows the receiver/decoder 2020 connectable to the communications server 3022 via the PSTN 12, and the communications server 3022 in turn being in communication with the subscriber management system ("SMS") 3004 and a variety of bank servers 104A to 104C. During the banking operation, one of the card readers 4036 is used to read the user's smart card, and the other card reader 4036 is used to read the user's bank card.

The operation of the system in the banking mode will now be described with reference to the flow diagrams of FIGS. 24 and 25. In each of these figures, the left side of the diagram illustrates the operation of the receiver/decoder 2020, and the right side of the diagram illustrates the operation of the remainder of the system.

In step 196, the user requests the banking mode, for example by pressing a dedicated button on the remote controller 2026 or by pressing a series of keys to call up a menu and navigate through it so as to select the banking mode. In step 198, the receiver/decoder 2020 extracts from the received MPEG-2 bitstream the banking application and associated data including the telephone number of the communications server 3022 and mounts the application.

Figure 24:
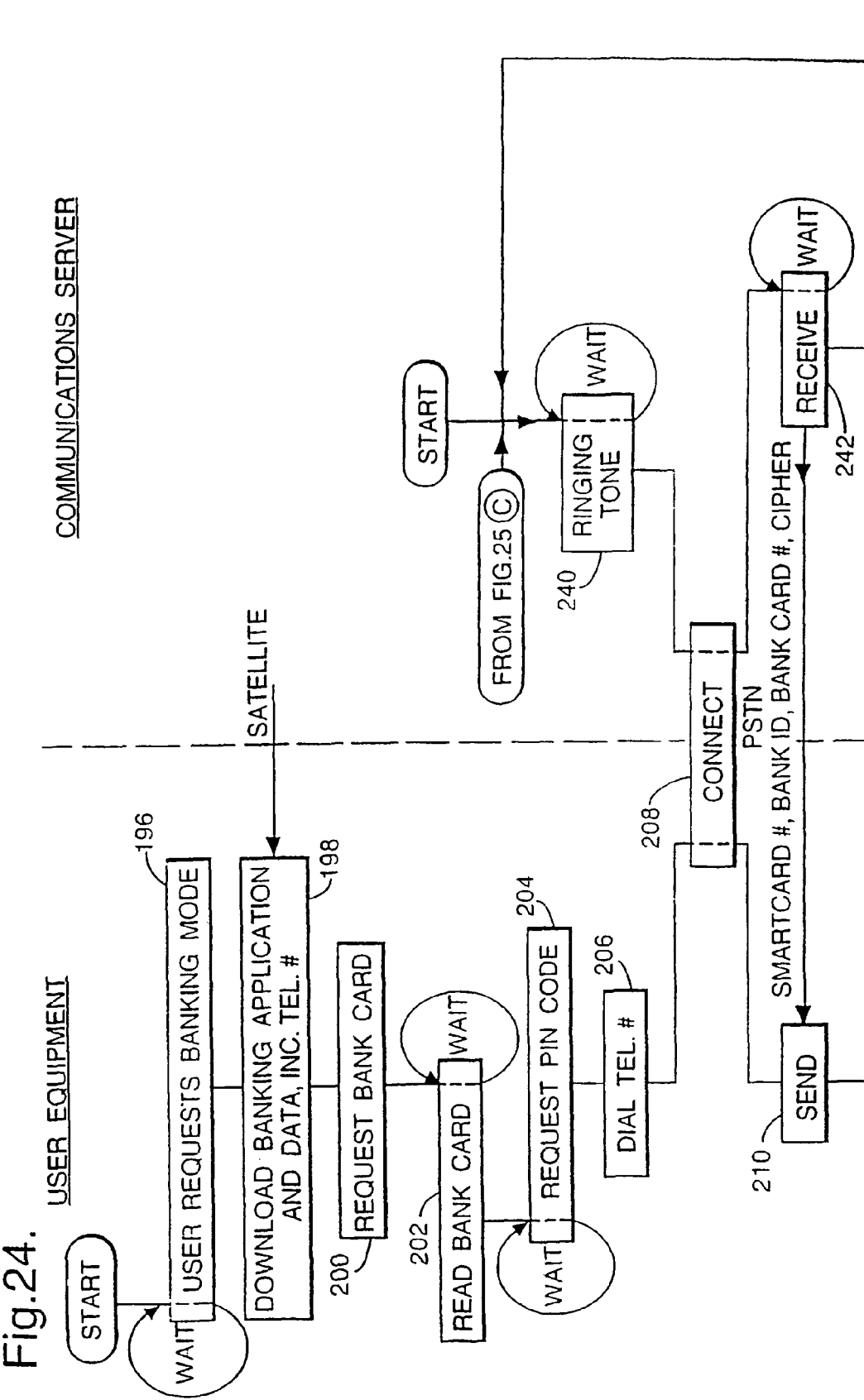
FIGS. 24-25 are a flow diagram illustrating an example of the operation of the system of FIG. 23.
Figure 24:
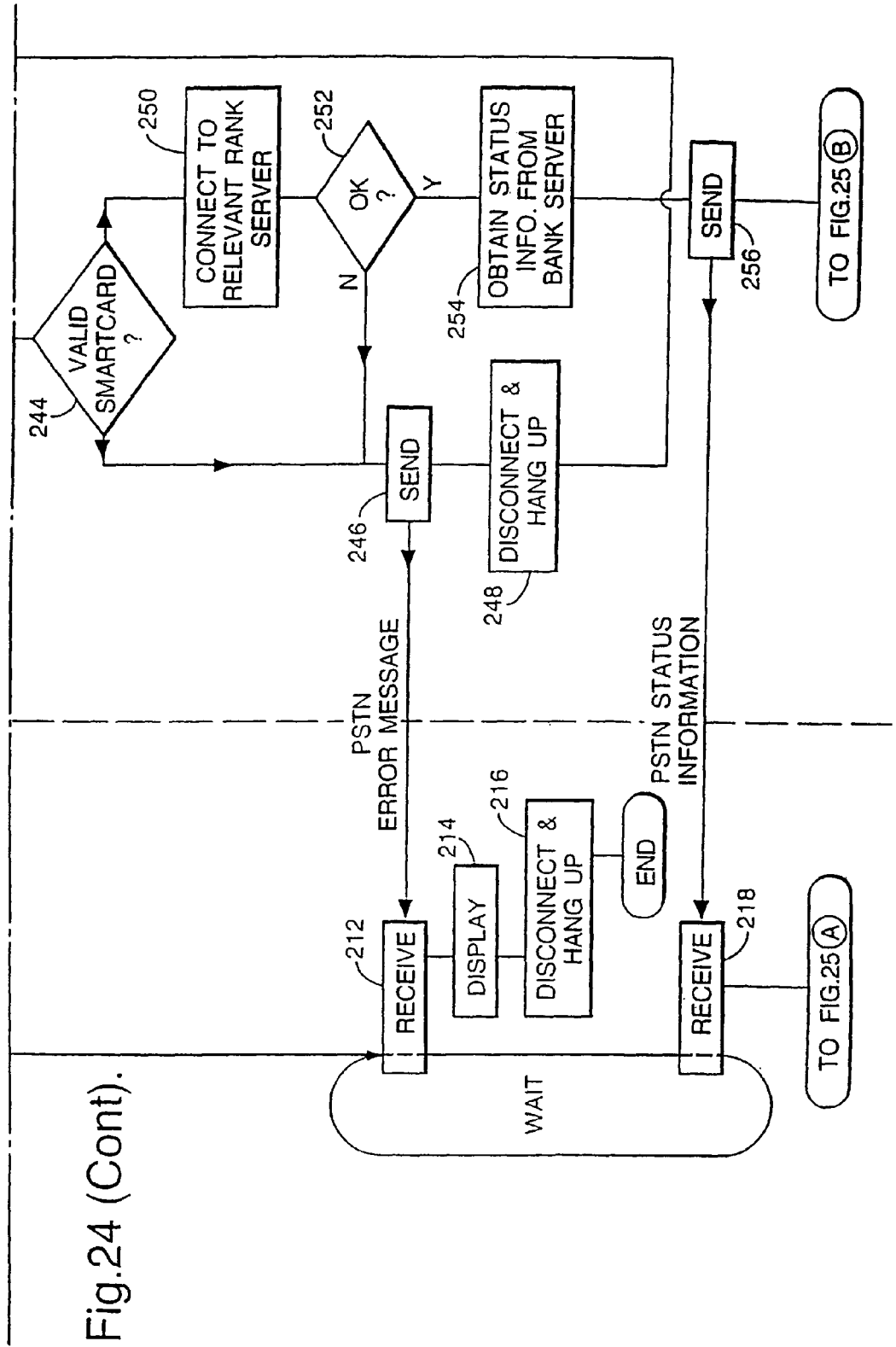
Figure 25:
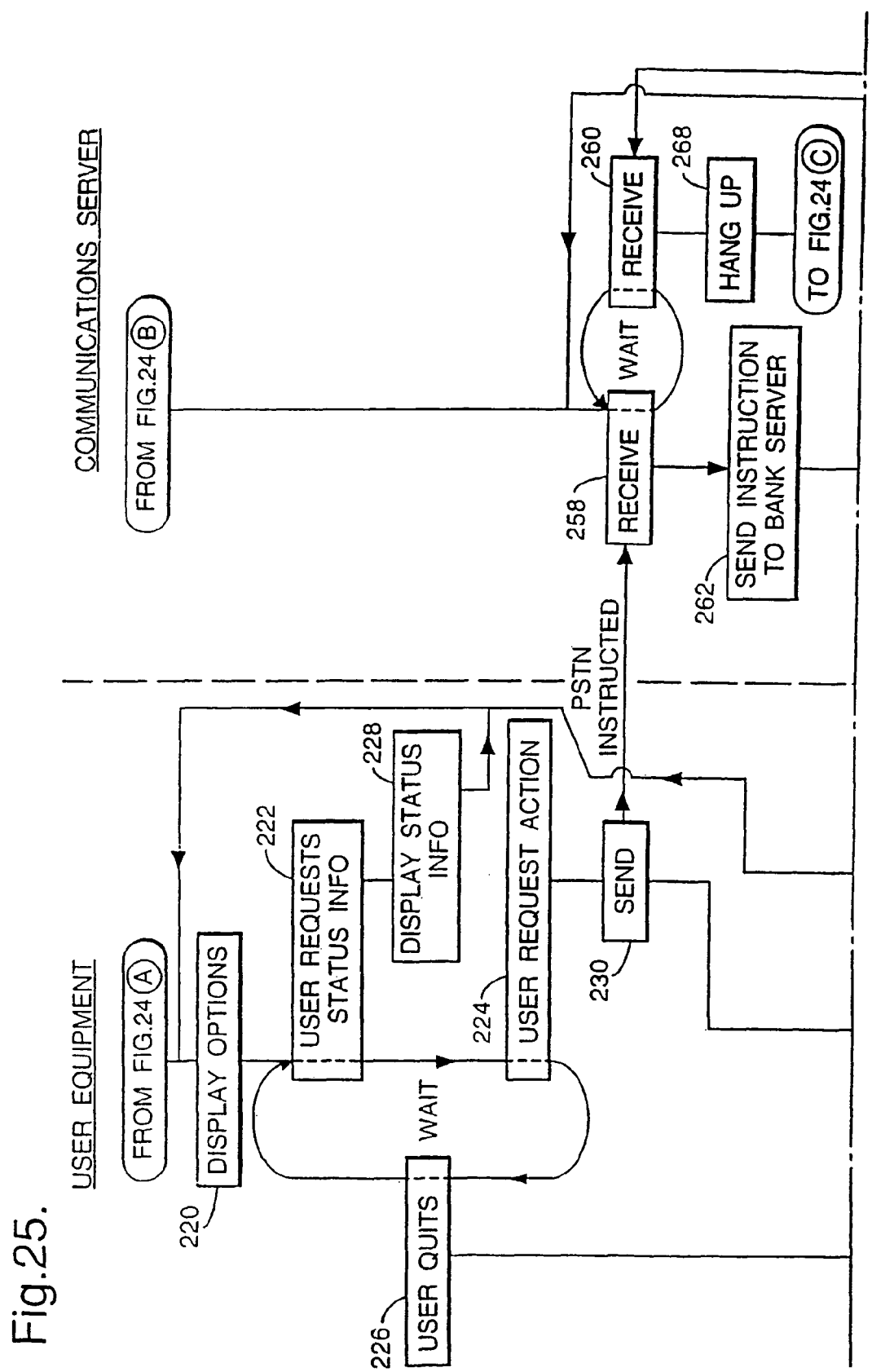
Figure 25:
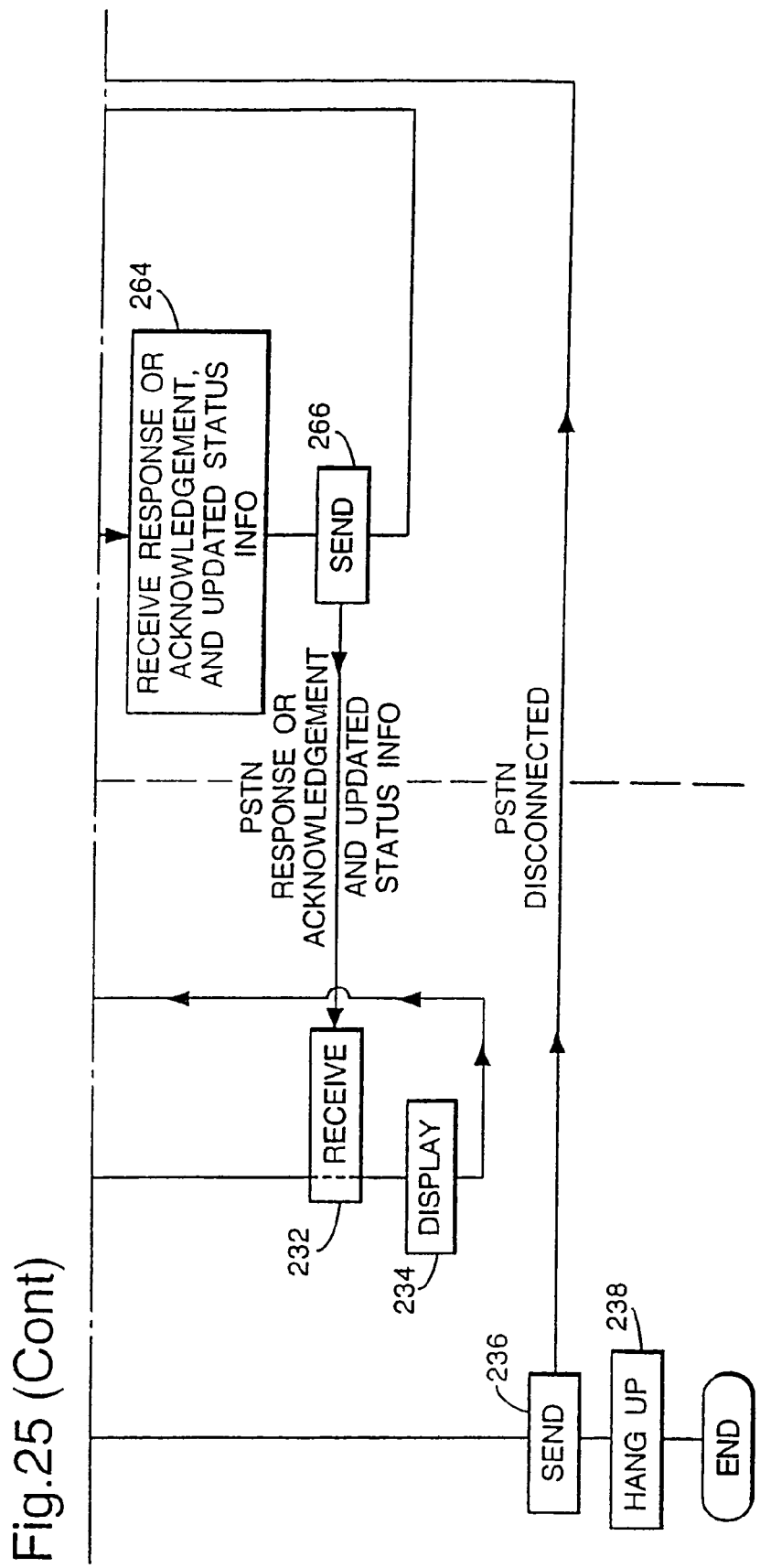

The remaining steps taken by the receiver/decoder 2020 in FIGS. 24 and 25 are caused to occur by the downloaded banking application. In step 200, the receiver/decoder 2020 causes the television 2022 to display a request to the user to enter their bank card into one of the card readers 4036. In step 202, the receiver/decoder 2020 reads the bank card and then causes the television 2022 to display a request to the user to enter their bank card PIN code using numerical buttons of the remote controller 2026. In step 206, the receiver/decoder 2020 causes its modem 4034 to dial the downloaded telephone number of the communications server 3022, and in step 208 a PSTN connection is made.

In step 210, the receiver/decoder 2020 sends to the communications server 3022 the smartcard number of the smartcard inserted in the other card reader, an ID of the user's bank as read from the bank card, the bank card number and a cipher. The receiver/decoder 2020 then waits either to receive an error message from the communications server 3022 in step 212 or to receive status information from the communications server 3022 in step 218. If the error message is received, then in step 214, that message is displayed, and then in step 216 the receiver/decoder 2020 disconnects and hangs up its modem 4034.

If the receiver/decoder 2020 receives status information in step 218, the status information will include, in one example, (1) the balance of the user's current account and brief details of the last nine transactions on the current account, (2) a statement of the transactions for the previous month on the user's credit card account, and (3) other information such as the availability of a cheque book or a credit card for collection from the user's bank branch. In step 220, the receiver/decoder 2020 causes the television 2022 to display various banking options, each having a respective button on the display. Examples of the options are:

Display current account (see 1 above);
Display credit card account (see 2 above);
Display other information (see 3 above);
Display deposit account;
Transfer between deposit account and current account;
Transfer between current account and credit card account;
Loan facilities;
Request printed statement; and
Request cheque book.

One of these option buttons has initial focus, and the focus can be changed by using the left, right, up and down buttons on the remote controller 2026. Then, when the OK button is pressed by the user, the option currently having focus is selected.

As shown by step 222, in the case of one of the status information options (1) to (3) being selected, in step 228 the appropriate information is displayed on the television 2022, and then the process returns to step 220 so that further options can be selected.

In the case of one of the other options being selected in step 224, the receiver/decoder 2020 requests from the user any required information, such as the amount of a transfer, which is then entered by the user using the remote controller 2026. Then, in step 230, the receiver/decoder 2020 sends an appropriate instruction to the communications server 3022. The receiver/decoder 2020 then waits to receive, in step 232, a response to or acknowledgement of the instruction, together with updated status information. The update of the status information is sent to the receiver/decoder 2020 because the selection of one of these action options may well change the status of the user's account(s). The received acknowledgement or response is then displayed on the television 2022 in step 234, and then the process returns to step 220 so that the user can select other options.

As an alternative to receipt of a request for status information in step 222 or a request for action in step 224, the receiver/decoder 2020 is also responsive at that stage to an instruction from the user to quit in step 226, and in that case, in step 236, the receiver/decoder 2020 sends a PSTN disconnect signal, and then in step 238 hangs up its modem 4034 to complete the banking operation.

The operation of the communications server 3022 in FIGS. 24 and 25 will now be described. In step 240, the communications server 3022 awaits a ringing tone, and in response thereto the connection is made with the receiver/decoder 2020 in step 208. The communications server 3022 then waits at step 242 to receive the information supplied by the receiver/decoder 2020 in step 210. Once received, in step 244, the communications server 3022 checks the validity of the smart card number with reference to the SMS 3004. If the smartcard is judged to be invalid, then in step 246 the communications centre 3022 sends the error message described above with respect to step 212. Then, the communications server 3022 disconnects the PSTN connection and hangs up its modem in step 248, and then the process proceeds to step 240 to await another ringing tone.

If, in step 244, the smartcard number is judged to be valid, then in step 250 the communications server 3022 connects to the appropriate one of the bank servers 104A to 104C as determined by the bank ID supplied by the receiver/decoder 2020. In step 252, if the connection cannot be made, then the process proceeds to step 246 described above. However, if the connection is made, then in step 254 the communications server 3022 obtains from the bank server the appropriate status information relating to the supplied bank card number. In step 256, this information is sent to the receiver/decoder 2020, as described above with reference to step 218.

The communications server 3022 then waits either to receive an instruction from the receiver/decoder 2020 in step 258 sent as a result of step 230 described above or to receive a PSTN disconnect signal in step 260 sent as a result of step 236 described above. If the PSTN disconnect signal is received in step 260, then in up 268 the communications server 3022 causes it modem to hang up and then the process proceeds to step to await another ringing tone. However, if an instruction is received in step 258, the communications server 3022 relays that instruction to the bank server 140, without changing the instruction but merely modifying the communication protocol as necessary. In step 264, the communications server 3022 receives a response or acknowledgement and updated status information from the bank server 140, and in step 266 relays that information to the receiver/decoder 2020, where it is received in step 232 described above, again without changing the data but merely modifying the communication protocol as necessary. Then, the process returns to steps 258/260 to await receipt of another instruction or a PSTN disconnect signal.

The quiz mode of operation will now be described. The quiz application is preferably synchronised with a broadcast quiz programme and enables the end user to participate actively in the quiz programme, with the receiver/decoder being able to check the end user's answers and optionally keep the end user's score.

Question data and answer data relating to and synchronised to the content of the television quiz programme extracted from the MPEG bitstream is contained in the private section of the MPEG bitstream and extracted therefrom by the receiver/decoder 2020.

By pressing appropriate buttons on the remote controller 2026, the end user is able to activate the quiz application, placing the receiver/decoder 2020 in a "quiz mode".

In the quiz mode, as a question is asked in the television quiz programme (during a "question" period) question data synchronised with and substantially corresponding to that question is extracted by the receiver/decoder from the MPEG bitstream and supplied to the television set. The question is typically a "multiple choice" question, in which the question includes a plurality of possible answers to the question. The question data is displayed on the screen of the television 2022, typically in the form of a plurality of icons or a plurality of numbered buttons.

Within a predetermined time period, or "answer period", for answering the question (typically several seconds), the end user may select one of the answers to the question displayed on the television set using the remote controller 2026. The answer data corresponding to the question data is extracted by the receiver/decoder 2020 from the MPEG bitstream and supplied to the television set 2022. The answer data is displayed on the screen of the television 2022, typically by either changing the display of the icon representing the answer chosen by the end user and/or changing the display of the icon representing the correct answer to the question, thereby informing the end user whether his answer was correct or not.

The question data is only transmitted at the very end of the question period or very beginning of the answer period; during the remainder of the answer period no question data is transmitted. To answer a particular question, the end user must enter the quiz mode during the question period otherwise he will miss that question, and the first question to be displayed on the television screen will be the following question.

As a new question is asked in the television programme, so the question data and answer data contained within the MPEG bitstream is changed to correspond to that question.

The application may keep count of the user's score, and cause the score to be displayed on the television screen.

Figure 26:
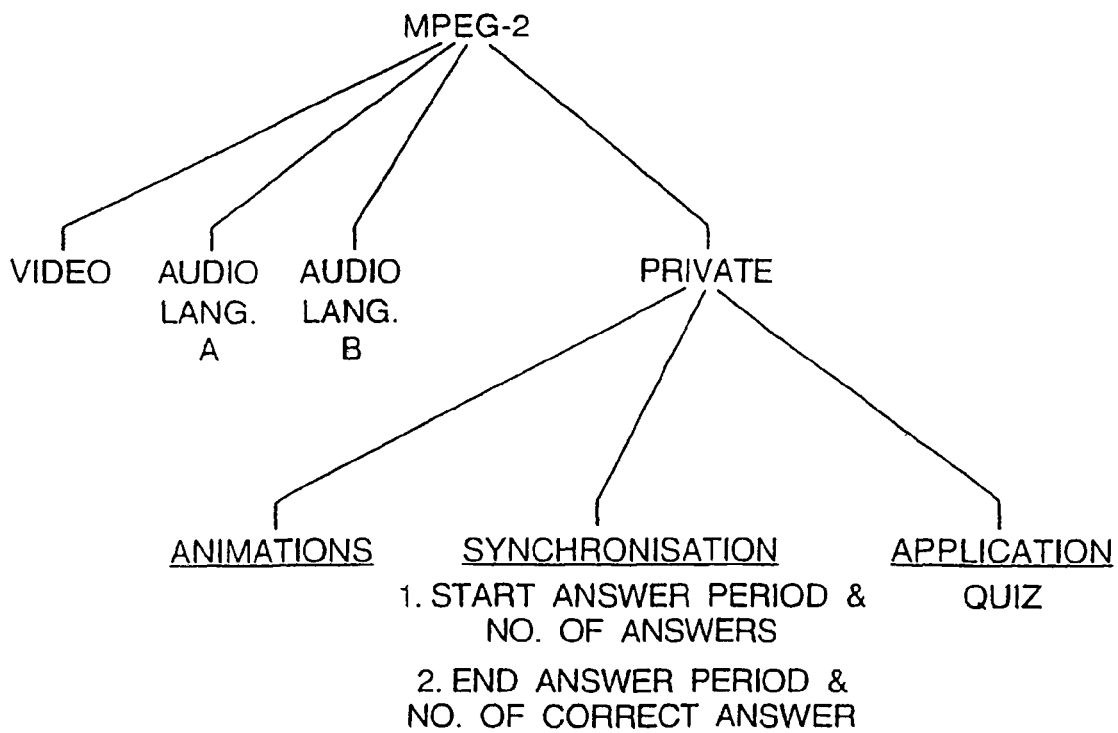
FIG. 26 shows an example of various components of the MPEG-2 bitstream used in the quiz mode.

Referring in particular to FIG. 26, the components of the broadcast MPEG-2 bitstream relating to a quiz programme comprises the quiz video section and one or more quiz audio sections, together with a private section. The private section contains (1) the quiz application to be run by the receiver/decoder 2020; (2) synchronisation data which can indicate: the start of an answering period and the number of possible answers; and the end of an answering period and the number of the correct answer; and (3) various animations.

Figure 27:
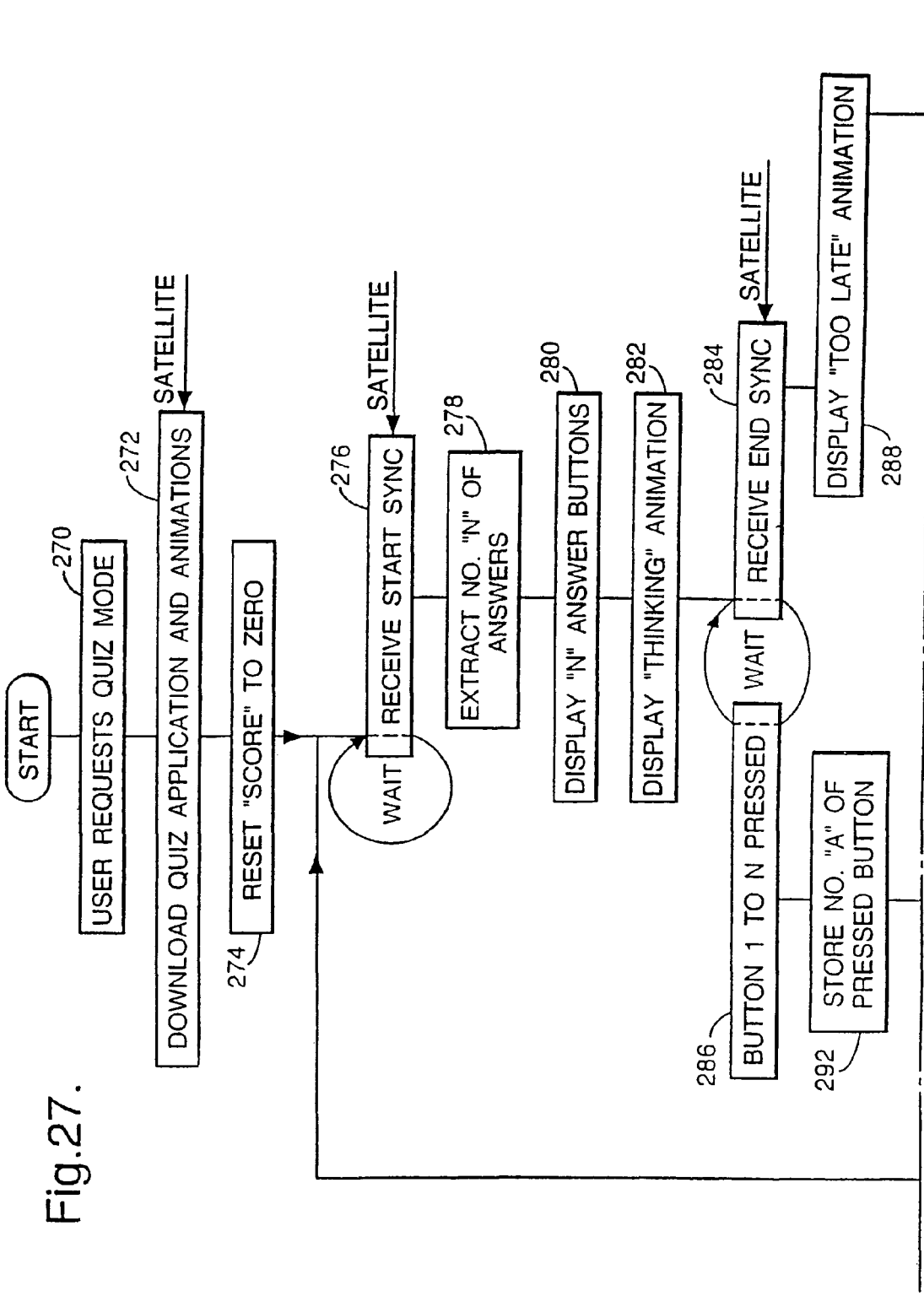
FIG. 27 is a flow diagram illustrating an example of the operation of the system when in the quiz mode.
Figure 27:
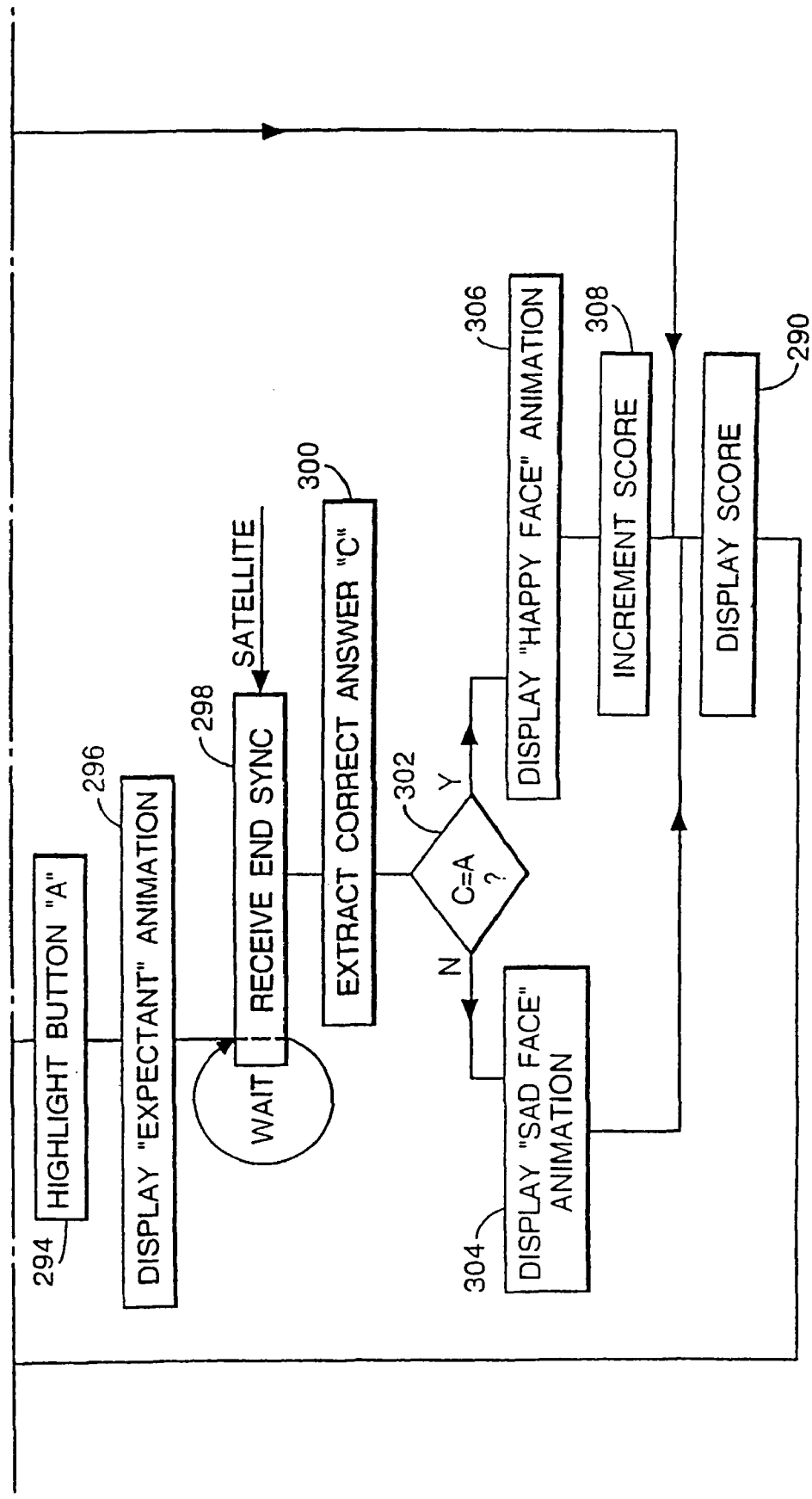

Referring to FIG. 27, the operation of the receiver/decoder 2020 in receiving a quiz programme with the quiz mode will now be described. In step 270, the user selects a quiz programme and the quiz mode, and as a result, in step 272 the quiz application and animations are downloaded and mounted in the receiver/decoder 2020. In step 274 a "score" variable is reset to 0. In the broadcast quiz television programme, the questioner will typically ask a multiple choice question having a predetermined number N of possible answers and then give a period of time for reply, the answering period. At the beginning of the answering period, the start synchronisation signal is transmitted, including the number N of possible answers to the relevant question. This is received by the receiver/decoder 2020 in step 276, and in step 278 the receiver/decoder 2020 extracts the number N of answers. Then, in step 280, the receiver/decoder 2020 causes the television 2022 to display a numbered set of answer buttons, equal in number to the number N. Also an animation is displayed in step 282, for example of a person scratching their head. The receiver/decoder 2020 then waits either to receive an end synchronisation signal in step 284 or for the user to press one of the numerical buttons 1 to N of the remote controller 2026 in step 286. If the end synchronisation signal is received before one of the buttons 1 to N is pressed, this signifies that the user is too late to answer the question, and therefore in step 288 a "too late" animation is displayed on the television 2022. The process then proceeds to step 290. However, if one of the remote controller buttons 1 to N is pressed in step 286, a note of the number A of the pressed button is made in step 292, and in step 294 the corresponding button A displayed on the television 2022 is highlighted, for example by an emboldened border. Also, an "expectant" animation is displayed on the television 2020 in step 296. Then, in step 298, the receiver/decoder 2020 waits to receive the end synchronisation signal, which includes the number C of the correct answer. In step 300, the receiver/decoder 2020 extracts the correct answer number C from the end synchronisation signal, and then in step 302 tests the equality of the numbers A and C. If they are unequal, then in step 304 the receiver/decoder 2020 causes the television 2022 to display a "sad face" animation, and then the process proceeds to step 290. However, if in step 302 the numbers A and C are judged to be equal, then in step 306 the receiver/decoder 2020 causes the television 2022 to display a "happy face" animation and then in step 308 increments the value of the variable "score". Then, in step 290, which follows steps 304, 308 and 288, the receiver/decoder 2020 causes the television 2022 to display the value "score". The process then returns to step 276 to receive the start synchronisation signal for the next question and answer of the quiz.

The magazine mode of operation of the system will now be described. The magazine browser application provides a network of magazine page data (the magazine) on the television screen and which can be traversed by the user.

The magazine page data is carried in the private sections of the transmitted MPEG-2 bitstream as video pictures in compressed form. By pressing appropriate buttons of the remote controller 2026, the end user is able to activate the magazine browser application, placing the receiver/decoder 2020 in an "magazine mode". When the receiver/decoder 2020 has been placed in the magazine mode, the application enables magazine page data to be extracted therefrom by the receiver/decoder 2020 and displayed on the screen of the television set 2022.

Each magazine page displayed on the screen of the television set typically comprises a still video image with a number of button objects superimposed on that image. A button object is typically a rectangle, which can be of any desired size, and can have a message displayed in it. The end user can, by using the remote controller, focus on any desired button object and can then select that object. The objects are typically linked to further pages so that selecting an object results in the system moving on to whichever new page is associated with a selected button object. The new page is extracted from the MPEG bitstream and displayed on the screen of the television set 2022.

The user can leave the magazine mode in two ways. First, most pages will have an "exit" button object which allows the user to exit the magazine application. Second, the magazine network of pages will often allow the user to reach a particular topic of interest and the user can then exit directly into that topic. The main system control screen allows the user to select a desired topic either directly from that screen or via some sequence of sub-screens. The magazine mode provides an alternative route for the user to reach at least some topics.

Each button object is defined by a module, with some associated parameters and is linked to the display through devices. One of the "parameters" of a button object can be a sound sequence which is played when the object is selected (ie. as the system moves on to the next selected screen). The sound sequence is stored as a file of the module.

Figure 28:
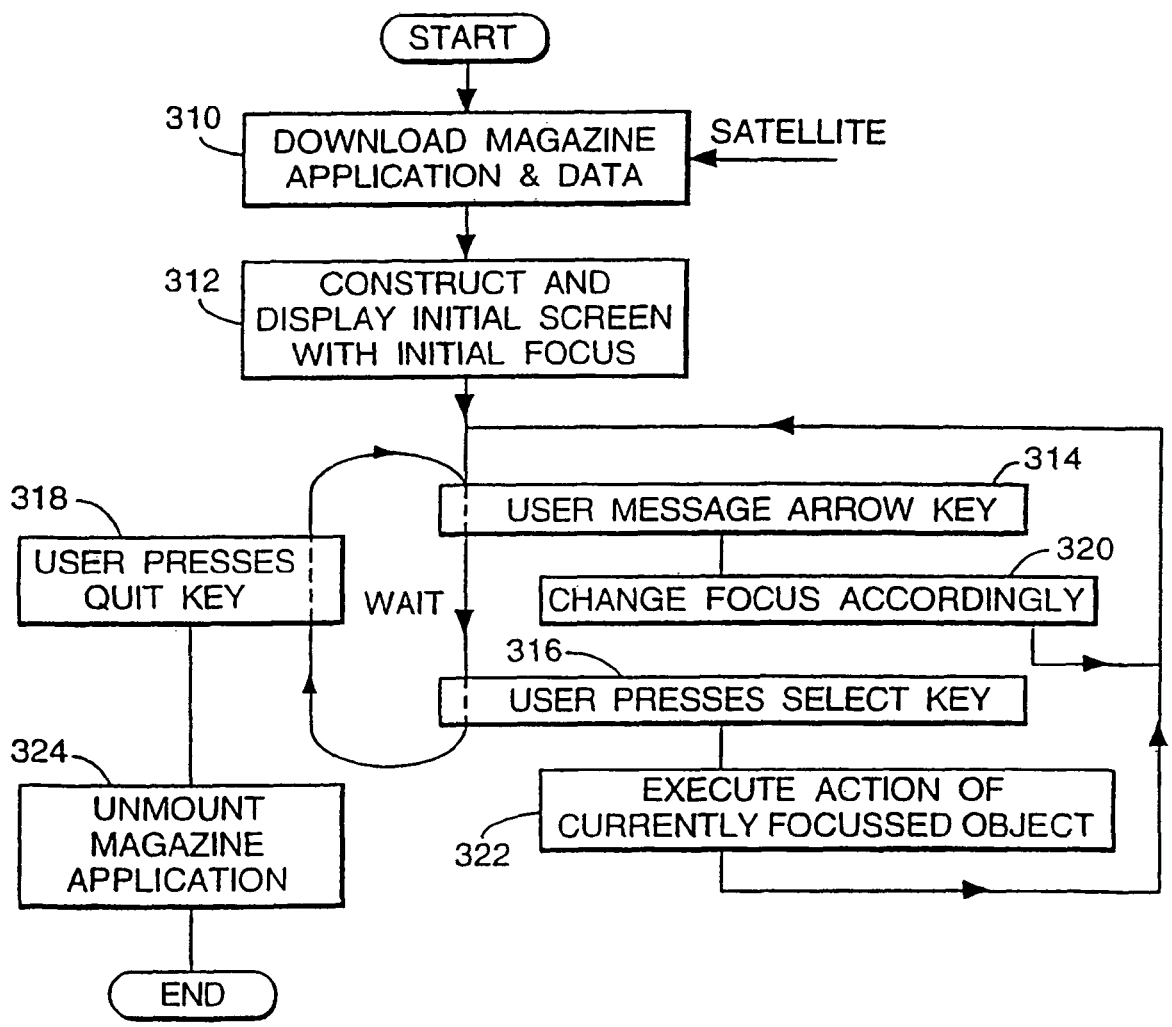
FIG. 28 is a flow diagram illustrating an example of the operation of the system when in the magazine mode.

Referring in particular to FIG. 28, the user requests the magazine mode, for example by pressing a dedicated key on the remote controller 2026 or by pressing a series of keys to call up a menu and navigate through it so as to select the magazine mode. In step 310, the receiver/decoder 2020 extracts from the received MPEG-2 bitstream the magazine application and associated data and mounts the application. The receiver/decoder 2020 then constructs an initial default screen with an initial focus on one of the objects of that screen and causes the television 2022 to display the screen.

As an example, the parameters associated with each screen may include:
   an identification of a background for the screen, which may be obtained from a compressed MPEG still picture;
   a list of objects and their parameters; and
   an indication of the object which has initial focus.

The list of objects and their parameters may include, for each object:
   the type of object, such as a still picture, a video sequence, a button object, an icon or text;
   an identification of the object, such as the address of the picture or video sequence, the type and colour of button object, the address of the icon, or the character string, font and colour of the text;
   the size of the object;
   the position of the object on the screen;
   the type of focus which the object may be given, such as a rectangular border or circular border and its colour;
   the identities of other objects to which the focus should be transferred from the object in question in response to operation by the user of the up, down, left and right keys of the remote controller 2026;
   one or more actions which should be taken when the object is selected, such as changing to another screen, playing a video, playing a sound file, running an instruction sequence, or downloading and running a different application.

Referring again to FIG. 28, after the initial screen has been constructed in step 312, the receiver/decoder 2020 waits (1) for the user to press one of the arrow keys of the remote controller 2026 in step 314; (2) for the user to press a "select" key of the remote controller 2026 in step 316; or (3) for the user to press a "quit" key of the remote controller 2026 in step 318.

If the user presses one of the arrow keys in step 314, then in step 320 the receiver/decoder 2020 causes the focus to change in accordance with the focus changing parameters for the object which currently has focus. The process then proceeds back to steps 314/316/318.

If the user presses the "select" key in step 316, then in step 322 the receiver/decoder 2020 executes the action(s) designated for the object which currently has focus. The process then proceeds back to steps 314/316/318.

If the user presses the "quit" key in step 318, then in step 32 for the receiver/decoder 2020 unmount the magazine application.

The magazine application has a variety of uses. For example, it may be used as a news magazine, as a reference work, and as a means of providing access to other applications available with the system, such as those described above, and to television programmes. As a further example, the magazine application may be used to provide listings and reviews of different events, such as cultural events, and the user, having as a result decided to purchase a ticket for a particular event, may then use the magazine application to start a ticket purchase application which would follow similar steps to the shopping application described above with reference to FIGS. 17 and 21, particularly steps 136 to 194.

The weather or traffic application will now be described. Like the other applications described above, when this is selected the application and related data is downloaded to the receiver/decoder 2020 and mounted. The weather or traffic application may have many similarities to the magazine application, and indeed some of the pages of the weather or traffic application may be navigated through using the same techniques as described above with respect to the magazine application.

The weather application has the facility to display weather reports and/or weather maps and/or video and/or audio sequences relating to the weather situation for different regions, and similarly the traffic application has the facility to display traffic reports and/or traffic maps and/or video and/or audio sequences relating to. the traffic situation for different regions. In each case, from an initial screen, the information for a particular region is selected by pressing buttons on the remote controller 2026 representing a code for that region. Furthermore, the code for each region is at least part of an established code for that region.

For example, in France, the code may be one of the ninety-five two-digit departement numbers (e.g. 75 for Paris), and in the USA may be the first two digits of the five-digit zip code. Indeed, in the case of the USA, the first digit of the zip code may be used to obtain wide-area weather information, and the first two digits of the zip code may be used to obtain more localised weather information. The traffic or weather information relating to each region may be contained in a separate file, and the relevant code may be incorporated in the file name so that the file can be addressed in part by the region code.

In countries where the most significant characters of a postal code are alphabetical, or alphabetical and numerical, such as in the United Kingdom, those characters may be used to select a particular region in the case where the remote controller 2026 has alphanumeric buttons. In other example, telephone area codes (or parts thereof) may be used to select a particular region. Because the region covered by a particular telephone area code may typically be smaller than that which can be usefully covered by a particular weather or traffic report, and because the codes for geographically adjacent telephone areas may bear little resemblance to each other, the system may be operable to download to the receiver/decoder 2020 a look-up table or database which provides a mapping from telephone area codes to regions covered by the weather and/or traffic information.

It will be understood that the present invention has been described above purely by way of example, and modifications of detail can be made within the scope of the invention.

Each feature disclosed in the description, and (where appropriate) the claims and drawings may be provided independently or in any appropriate combination.

In the aforementioned preferred embodiments, certain features of the present invention have been implemented using computer software. However, it will of course be clear to the skilled man that any of these features may be implemented using hardware. Furthermore, it will be readily understood that the functions performed by the hardware, the computer software, and such like are performed on or using electrical and like signals.

Cross reference is made to our co-pending applications, all bearing the same filing date, and entitled Signal Generation and Broadcasting; application Ser. No. 10/347,576), Smartcard for use with a Receiver of Encrypted Broadcast Signals, and Receiver; U.S. Pat. No. 7,043,020), Broadcast and Reception and Conditional Access System therefor; U.S. Pat. No. 7,644,429), Method of Downloading of data to an MPEG Receiver/Decoder and MPEG Transmission System for Implementing the Same; U.S. Pat. No. 6,938,166), Transmission and Reception of Television Programmes and Other Data; application Serial No. 10/679,241), Television or Radio Control System Development; U.S. Pat. No. 6,360,195), Extracting Data Sections from a Transmitted Data Stream; application Ser. No. 09/400,315), and Broadcast and Reception System, and Receiver/Decoder and Remote Controller therefor; U.S. Pat. No. 7,386,869). The disclosures of these documents are incorporated herein by reference. The list of applications includes the present application.

The invention claimed is:

1. A method of transmitting a television programme and other data, comprising:
  at a transmitting system, integrating into a digital datastream an application code for an application for causing the receiver/decoder to operate in an Internet mode; and transmitting the digital datastream containing at least one television programme;
  at a user's receiver/decoder:
    receiving the digital datastream;
    in a download mode, extracting the application code from the digital datastream; and
    in the download mode, starting the application defined by the extracted application code to cause the receiver/decoder to operate in the Internet mode,
    wherein the receiver/decoder, operating in Internet mode, is configured to:
      use a modem to communicate with a communications centre via a public switched telephone network (PSTN) connection;
      receive an Internet request from the user; and
      transmit the Internet request via the modem to the communications centre;
    wherein the receiver/decoder, operating in a television mode, is configured to:
      extract such a television programme from the digital datastream; and
      supply the extracted television programme to a television; and
    wherein, the communications centre is configured to:
      receive such an Internet request;
      obtain from the Internet a response to the received Internet request; and
      supply the Internet response to the transmitting system by sending a data packet, over the PSTN connection, containing information to enable the receiver/decoder to extract the Internet response sent over a satellite link;
    at the transmitting system, integrating the supplied Internet response into the digital datastream; and
    at the receiver/decoder, in the Internet mode, extracting the Internet response from the digital datastream sent over the satellite link and supplying the extracted Internet response to the user.

2. The method as claimed in claim 1, wherein the extracted Internet response is supplied to the user by being displayed on the television.

3. The method as claimed in claim 1, wherein the extracted Internet response is supplied to the user via a computer connected to the receiver/decoder.

4. The method as claimed in claim 1, wherein the transmitting system transmits the digital datastream in an MPEG format, and the data other than the television programme(s) is included in at least one private section of the MPEG datastream.

5. A digital television receiver/decoder, comprising:
  datastream receiving means for receiving a digital datastream, wherein the received digital datastream comprises an application code integrated into the digital datastream before transmission, wherein the application code is for an application that, when executed, causes the receiver/decoder to operate in an Internet mode;
  extracting means for extracting a television programme, the application code, and an Internet response from the received datastream, wherein the Internet response is extracted by receiving a data packet, over the PSTN connection, containing information to enable the receiver/decoder to extract the Internet response sent over a satellite link,
  television supplying means for supplying the extracted television programme to a television;
  user input interface means for receiving an Internet request from the user in Internet mode, wherein the receiver/decoder starts the application defined by the extracted application code to cause the receiver/decoder to operate in the Internet mode,; and
  a modem for dialing up a communications centre via a public switched telephone network (PSTN) connection and transmitting the received Internet request to the communications centre in Internet mode.

6. The receiver/decoder as claimed in claim 5, wherein the television supplying means is operable to supply the extracted Internet response to the television.

7. The receiver/decoder as claimed in claim 5, further including a computer output port, the receiver/decoder being operable to supply the extracted Internet response to a computer connected to the computer output port.

8. The receiver/decoder as claimed in claim 5, wherein the extracting means is operable to extract application code from the digital datastream; and further including processing means operable to start an application defined by the extracted application code.

9. The receiver/decoder as claimed in claim 5, wherein the datastream receiving means is operable to receive such a datastream in an MPEG format, and the extracting means is operable to extract the data other than the television programme(s) from at least one private section of the MPEG datastream.

10. A communications and digital television transmission system, comprising:
  a transmitting system for transmitting a digital datastream containing at least one television programme, wherein the digital datastream comprises an application code integrated into the digital datastream, wherein the application code is for an application that, when executed, causes a receiver/decoder configured to receive the digital datastream to operate in an Internet mode,
  wherein the receiver/decoder is configured to extract the application code and start the application to operate in Internet mode; and
  a communications centre operable to:
    receive an Internet request from a user's modem via a public switched telephone network (PSTN) connection,
    obtain from the Internet a response to the received Internet request, and
    supply the Internet response to the transmitting system by sending a data packet, over the PSTN connection, containing information to enable the receiver/decoder to extract the Internet response sent over a satellite link;

the transmitting system being operable to integrate the supplied Internet response into the digital datastream.

11. The communications and digital television transmission system as claimed in claim 10, wherein the transmitting system is also operable to integrate into the digital datastream application code for an application for causing a digital television receiver/decoder to operate in an Internet mode.

12. The communications and digital television transmission system as claimed in claim 10, wherein the transmitting system transmits the digital datastream in an MPEG format, and the data other than the television programme(s) is included in at least one private section of the MPEG datastream.

* * * * *